United States Patent
Asami et al.

(10) Patent No.: US 10,545,354 B2
(45) Date of Patent: Jan. 28, 2020

(54) DESIGNING METHOD AND DESIGNING DEVICE FOR PROGRESSIVE POWER LENS

(71) Applicant: HOYA LENS THAILAND LTD., Prachatipat, Thanyaburi, Pathumthani (TH)

(72) Inventors: Hiroshi Asami, Tokyo (JP); Ayumu Ito, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 127 days.

(21) Appl. No.: 15/576,266

(22) PCT Filed: May 26, 2016

(86) PCT No.: PCT/JP2016/065598
§ 371 (c)(1),
(2) Date: Nov. 21, 2017

(87) PCT Pub. No.: WO2016/190392
PCT Pub. Date: Dec. 1, 2016

(65) Prior Publication Data
US 2018/0149883 A1     May 31, 2018

(30) Foreign Application Priority Data
May 26, 2015   (JP) ................. 2015-106887

(51) Int. Cl.
G02C 7/02      (2006.01)
G02C 7/06      (2006.01)
G06F 17/50     (2006.01)

(52) U.S. Cl.
CPC ............ *G02C 7/027* (2013.01); *G02C 7/061* (2013.01); *G06F 17/5009* (2013.01); *G06F 2217/16* (2013.01)

(58) Field of Classification Search
CPC .......... G02C 7/02; G02C 7/024; G02C 7/025; G02C 7/027; G02C 7/041; G02C 7/06;
(Continued)

(56) References Cited

U.S. PATENT DOCUMENTS 6,193,370 B1*  2/2001  Shirayanagi ........... G02C 7/025
                                               351/159.62
2006/0176445 A1*  8/2006  Shinohara .............. G02C 7/061
                                               351/159.48
(Continued)

FOREIGN PATENT DOCUMENTS

EP   1 688 781 A1   8/2006
EP   2 713 198 A1   4/2014
(Continued)

OTHER PUBLICATIONS

Jan. 8, 2019 Extended Search Report issued in European Patent Application No. 16800096.6.
(Continued)

*Primary Examiner* — William R Alexander
*Assistant Examiner* — Ephrem Z Mebrahtu
(74) *Attorney, Agent, or Firm* — Oliff PLC

(57) ABSTRACT

A vision simulation, on assumption that spectacles are worn, is performed for a first model designed by setting a target additional power of a desirable value at a position corresponding to a fitting point on a principal meridian. A correction amount is computed for correcting the difference between a simulation value obtained for the additional power at the position corresponding to the fitting point on the principal meridian through the vision simulation and the target additional power. A second model is designed by replacing the additional power with a value obtained by the addition of the calculated correction amount to the target additional power.

5 Claims, 37 Drawing Sheets

(58) Field of Classification Search
CPC ......... G02C 7/061; G02C 7/065; G06F 17/50; G06F 17/5009; G06F 2217/16; Y02E 60/76; Y04S 40/22
See application file for complete search history.

(56) References Cited

U.S. PATENT DOCUMENTS

| | | | |
|---|---|---|---|
| 2012/0113387 A1* | 5/2012 | Mori | G02C 7/061 |
| | | | 351/159.42 |
| 2015/0116657 A1 | 4/2015 | Altheimer et al. | |

FOREIGN PATENT DOCUMENTS

| | | |
|---|---|---|
| JP | H07-159737 A | 6/1995 |
| JP | 2012-022288 A | 2/2012 |
| JP | 2012-185424 A | 9/2012 |
| JP | 2013-217948 A | 10/2013 |

OTHER PUBLICATIONS

Jul. 26, 2016 International Search Report issued in International Patent Application No. PCT/JP2016/065598.

\* cited by examiner

DESIGNING METHOD AND DESIGNING DEVICE FOR PROGRESSIVE POWER LENS

TECHNICAL FIELD

The present invention relates to a designing method and a designing device for a progressive power lens.

BACKGROUND ART

Spectacle lens types include not only mono-focal lenses, but also progressive power lenses.

Examples of conventional progressive power lenses includes a spectacle lens which has a corridor where the radius of curvature progressively changes along the principal meridian passing through approximately the center of the lens, so that a predetermined addition power is provided between the center of the distance portion and the center of the near portion on the principal meridian (see PTL 1).

In the progressive power lens according to PTL1: a fitting point is set between the start point and the end point of the corridor; the average gradient of the addition power from the start point of the corridor to the vicinity of the fitting point differs from the average gradient of the addition power from the vicinity of the fitting point to the end point of the corridor; and about 0.5 diopters of addition power is added to the distance power at the fitting point. By controlling the surface power, a target addition power is set at the fitting point.

In the prior art according to PTL1, about 0.5 diopters of power is added to the distance power at the fitting point as the target addition power, regardless the addition power prescribed for each user (prescription addition power), hence a region of about 2 m ahead, which is set as the target distance, can be clearly viewed, regardless the prescription addition power of the user.

CITATION LIST

Patent Literature

[PTL1] Japanese Patent Application Publication No. H7-159737

SUMMARY OF INVENTION

Technical Problem

According to the prior art disclosed in PTL1, the surface power is controlled to design a lens, so that the target addition power (e.g. 0.5 diopters) is set at the fitting point.

However, if the designed progressive power lens is actually worn, the addition power deviates from the target addition power.

It is an object of the present invention to provide a design method and a design device for a progressive power lens, which can maintain the addition power at the fitting point to be the target value when spectacles using this progressive power lens are worn.

Solution to Problem

A design method for a progressive power lens according to the present invention is a design method for a progressive power lens in which: an intermediate region where an addition power continuously changes is provided between a first region for providing a first power and a second region for providing a second power; a principal meridian is provided in the first region, the intermediate region and the second region; a progression-start point through which the principal meridian passes is set in a portion of the intermediate region adjacent to the first region; a progression-end point through which the principal meridian passes is set in a portion of the intermediate region adjacent to the second region; and a fitting point is set at a position between the progression-start point and the progression-end point, along an extended line of a portion of the principal meridian that passes through the first region. The design method includes: a simulation step of performing a vision simulation, on the assumption that spectacles are worn, for a first model designed by setting a desired value of a target addition power at a position corresponding to the fitting point on the principal meridian; a computing step of computing a correction amount for correcting the difference between the target addition power and a simulation value for an addition power at the position corresponding to the fitting point on the principal meridian, obtained in the simulation step; and a design step of designing a second model by setting again an addition power, which is obtained by adding the correction amount computed in the computing step to the target addition power, at the position corresponding to the fitting point on the principal meridian.

In the present invention, the first model is designed first. The surface power is controlled to set the target addition power of the first model. The vision simulation, on the assumption that spectacles are worn, is performed for this first model. A device utilizing a known ray tracing method can be used for the vision simulation.

After performing the vision simulation, the correction amount for correcting the difference between the target addition power and the simulation value for the addition power at the fitting point is computed, and the second model is designed by setting again the addition power, obtained by adding this correction amount to the initial target addition power, at the fitting point.

Therefore, in the present invention, the vision simulation on the assumption that the spectacles are actually worn, is performed for the first model, hence in the second model, the target addition power at the fitting point is unlikely to deviate from the addition power when the spectacles are worn.

In a preferable configuration in the present invention, the simulation step is performed a plurality of times with changing numeric values of at least one parameter of the target addition power of the first model, a prescription addition power which is determined by the difference between the first power and the second power, a cylindrical power, a cylindrical axis direction, a prism power, a prism base direction, and a spherical power in a region for providing the first power. In the computing step, the correction amount is computed for each simulation. In the design step, the addition power at the position corresponding to the fitting point on the principal meridian for designing the second model is set, based on a relationship between the correction amount and at least one of: the target addition power, the prescription addition power, the spherical power, the cylindrical power, the cylindrical axis direction, the prism power, and the prim base direction, which are stored in advance.

In this configuration, the main reasons why the addition power when the progressive power lens is actually worn deviates from a set target addition power are related to such factors as the amount of the target addition power, the prescription addition power, the spherical power, the cylindrical power, the cylindrical axis direction, the prism power and the prism base direction, hence the correction amount is determined first for each data related to these factors. Then an appropriate correction amount is determined based on this data.

Therefore the deviation amount of the target addition power at the fitting point from the addition power when the lens is actually worn, can be extremely small.

In a preferable configuration in the present invention, a determination step of re-performing the simulation on the assumption that the spectacles are worn, and determining whether a re-performed simulation value and the desired value coincide, based on the difference between the re-performed simulation value and the desired value, is included after the design step. When the re-performed simulation value and the desired value are determined not to coincide in the determination step, the design step is re-performed.

In this configuration, it can be confirmed in the determination step whether the correction of the designed progressive power lens is performed accurately. If the correction has not been performed accurately, the deviation of the target addition power at the fitting point from the addition power when the lens is actually worn can be reliably reduced by re-performing the design step.

In a preferable configuration in the present invention, the fitting point is set at a position between the progression-start point and the progression-end point, along an extended line of a portion of the principal meridian that passes through the first region, and the target addition power is set in accordance with a target distance to a target position which a user desires to clearly see, and an average gradient of an addition power between the progression-start point and the fitting point is set to differ from an average gradient of an addition power between the fitting point and the progression-end point.

In this configuration, the above mentioned effect can be obtained in a lens which allows clearly seeing the position which is set as the target distance, regardless the prescription addition power of the user.

A design device for a progressive power lens according to the present invention is a design device for a progressive power lens in which: an intermediate region where an addition power continuously changes is provided between a first region for providing a first power and a second region for providing a second power; a principal meridian is provided in the first region, the intermediate region and the second region; a progression-start point through which the principal meridian passes is set in a portion of the intermediate region adjacent to the first region; a progression-end point through which the principal meridian passes is set in a portion of the intermediate region adjacent to the second region; and a fitting point is set at a position between the progression-start point and the progression-end point, along an extended line of a portion of the principal meridian that passes through the first region. The design device includes: a simulation device that performs a vision simulation, on the assumption that spectacles are worn, for a first model designed by setting a desired value of a target addition power at a position corresponding to the fitting point on the principal meridian, a plurality of times with changing at least one parameter of the target addition power of the first model, a prescription addition power which is determined by the difference between the first power and the second power, a cylindrical power, a cylindrical axis direction, a prism power, a prism base direction, and a spherical power in a region for providing the first power; and a computer that designs the progressive power lens based on a result obtained by the simulation device. The computer includes: a computing unit that computes, for each simulation, a correction amount for correcting the difference between the target addition power and a simulation value for an addition power at the fitting point, based on information from the simulation device; a storage unit that stores a relationship between the correction amount and at least one of the target addition power, the prescription addition power, the spherical power, the cylindrical power, the cylindrical axis direction, the prism power and the prism base direction, based on a result computed by the computing unit; an input unit that inputs information of at least one of the target addition power, the prescription addition power, the spherical power, the cylindrical power, the cylindrical axis direction, the prism power and the prism base direction; and a control unit that determines the correction amount for designing a second model according to the information input from the input unit and the information stored in the storage unit; and a design unit that designs the second model by adding the correction amount determined by the control unit to the target addition power, and setting again a corrected addition power at the position corresponding to the fitting point on the principal meridian.

According to the present invention, a design device for a progressive power lens, which allows obtaining the above mentioned effect, can be implemented.

DESCRIPTION OF EMBODIMENTS

Embodiments of the present invention will be described with reference to the drawings.

[Progressive Power Lens]

Figure 1A:
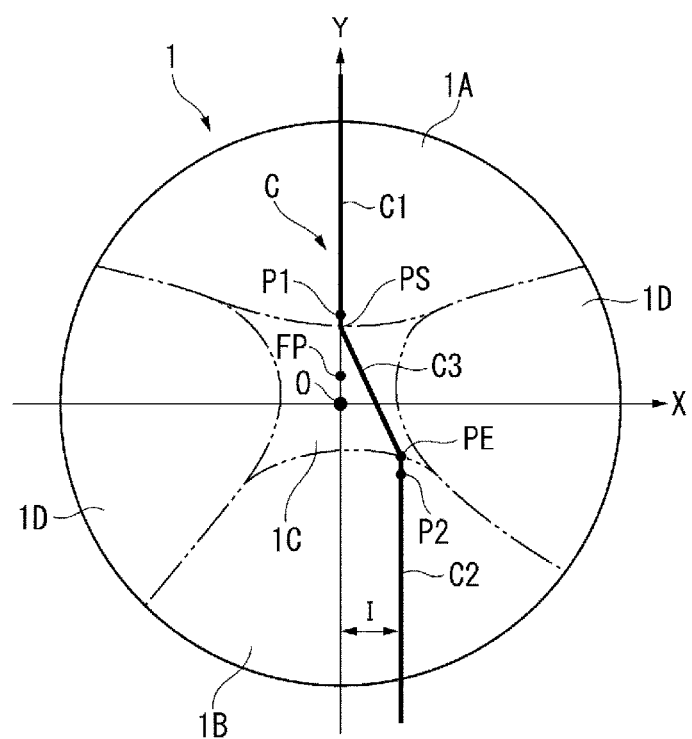
FIG. 1A is a schematic plan view depicting a progressive power lens designed by a method according to an embodiment of the invention.

FIG. 1A is a front view of a progressive power lens.

As illustrated in FIG. 1A, a progressive power lens 1 includes: a first region 1A for providing a first power D1, a second region 1B for providing a second power D2, an intermediate region 1C disposed between the first region 1A and the second region 1B, and side regions 1D which are disposed on both sides of the intermediate region 1C.

The first region 1A is a region for distance vision, and the second region 1B is a region for near vision. The intermediate region 1C is a progressive region where an addition power continuously changes.

A principal meridian C is a line along a position on the lens where the line of sight passes most frequently when the distance vision is shifted to the near vision in the state of wearing the progressive power lens (when the line of sight is moved from the upper part to the lower part of the lens). In the progressive power lens 1 designed according to the embodiments, an eyeball side is a progressive surface, and an object side is a spherical surface.

A progression-start point PS is set on the principal meridian C at a position adjacent to the first region 1A of the intermediate region 1C, and a progression-end point PE is set at a position adjacent to the second region 1B.

The principal meridian C is constituted by: a linear portion C1 which corresponds to the first region 1A and is set on a vertical Y axis; a linear portion C2 which corresponds to the second region 1B and is set to be parallel with the Y axis and distant from the Y axis in an X axis direction by dimension I; and a linear portion C3 which corresponds to the intermediate region 1C and connects the progression-start point PS and the progression-end point PE.

In the first region 1A, a first measurement reference point P1 is set to measure an amount of the first power provided by the first region 1A. The first measurement reference point P1 is set in an upper vicinity of the progression-start point PS on the principal meridian. For example, the first measurement reference point P1 may be disposed at the center of a first power measurement reference circle (not illustrated), so that the progression-start point PS coincides with the arc of the first power measurement reference circle.

In the second region 1B, a second measurement reference point P2 is set to measure an amount of the second power provided by the second region 1B. The second measurement reference point P2 may be set in a lower vicinity of the progression-end point PE on the principal meridian C. For example, the second measurement reference point P2 may be disposed at the center of the first power measurement reference circle (not illustrated), so that the progression-end point PE coincides with the arc of the first power measurement reference circle.

A fitting point FP is set at a position which is between the progression-start point PS and the progression-end point PE, and is along an extended line of the linear portion C1 of the principal meridian C. In this embodiment, the extended line is a part of the Y axis located in the intermediate region 1C.

The fitting point FP is set on the first region 1A side of an origin O in FIG. 1A, but may coincide with the origin O, or may be set on the second region 1B side of the origin O.

Figure 1B:
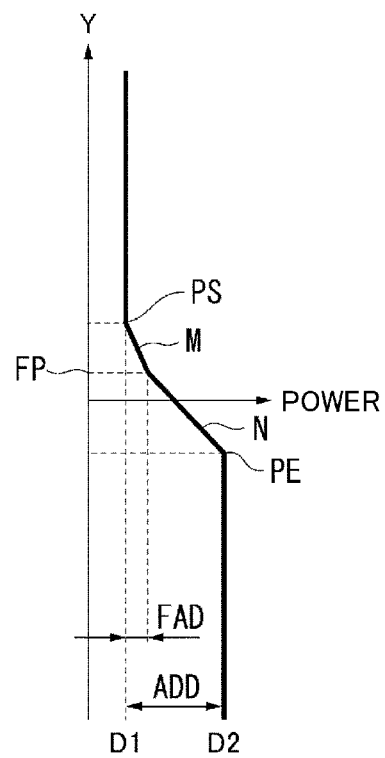
FIG. 1B is a graph depicting the relationship between the power and the position on the principal meridian, which schematically depicts the progressive power lens designed by a method according to an embodiment of the invention.

In FIG. 1B, the power at a position on the principal meridian C is illustrated.

As illustrated in FIG. 1B, on the principal meridian C, the power is the first power D1 diopters in the linear portion C1 from the first region 1A to the progression-start point PS, increases from the D1 diopters to the D2 diopters in the linear portion C3 from the progression-start point PS to the progression-end point PE, and remains at the D2 diopters in the linear portion C2 from the progression-end point PE to the lower part of the second region 1B.

The difference of the addition power between the progression-start point PS and the progression-end point PE is a prescription addition power ADD, which is set according to the prescription of the user, and ADD=D2−D1.

In the embodiments, the addition power at the fitting point FP is set as a target addition power FAD. The target addition power FAD is set based on the relationship with a desired value, regardless the amount of the prescription addition power ADD. The desired value here is set according to a target distance to a target position at which the user wishes to clearly see.

If the target distance is d, the target addition power FAD is (1/d). For example, if the target distance d is 1.0 m, the target addition power FAD is 1/1.0 (m)=1.0 (diopters (D)), and if the target distance d is 2.0 m, the target addition power FAD is 1/2.0 (m)=0.5 (diopters (D)).

An average gradient M of the addition power between the progression-start point PS and the fitting point FP is set to differ from an average gradient N of the addition power between the fitting point FP and the progression-end point PE. Thereby, a distance point at the fitting point FP can be fixed, and the target distance can be clearly seen regardless the prescription addition power ADD.

[Embodiment 1]

Figure 2:
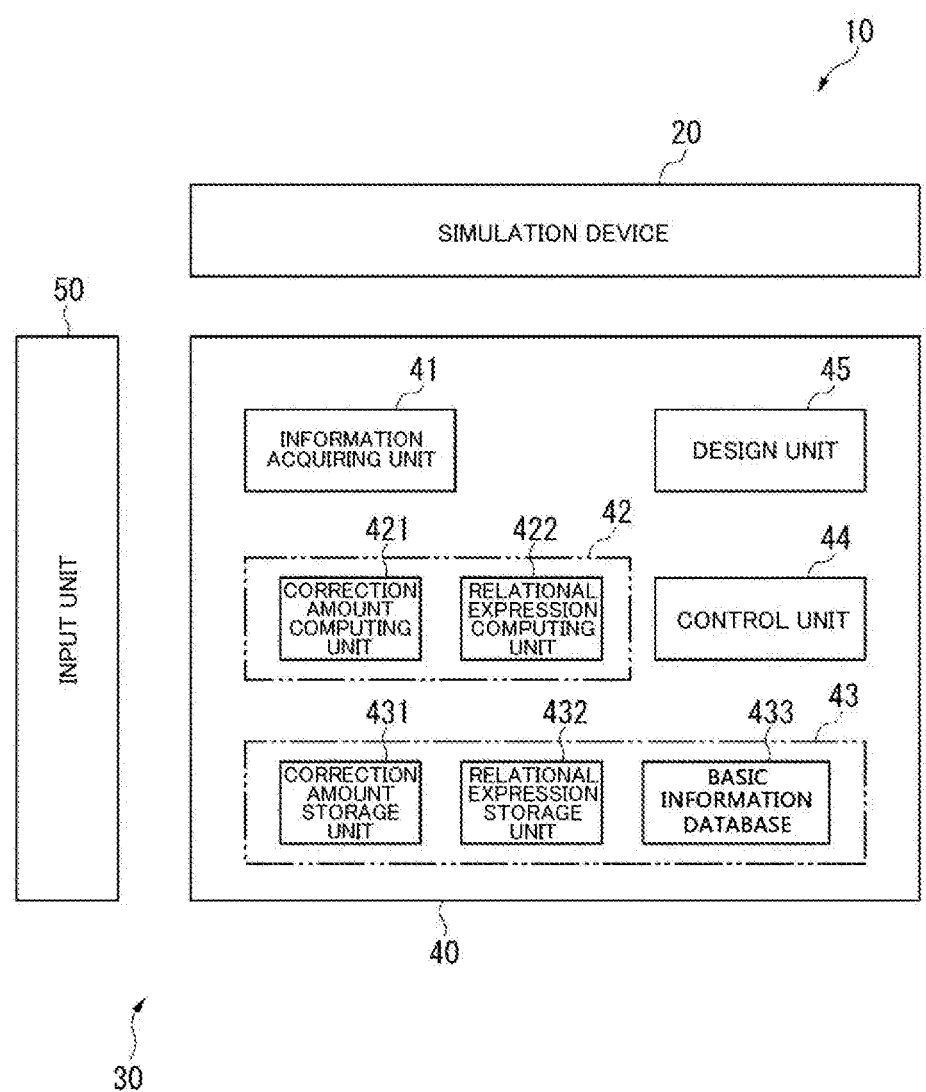
FIG. 2 is a block diagram depicting a design device for the progressive power lens according to Embodiment 1.

FIG. 2 is a block diagram of a design device 10 for the progressive power lens of Embodiment 1.

In FIG. 2, the design device 10 includes a simulation device 20 and a computer 30.

The simulation device 20 is for performing a vision simulation on the assumption that the spectacles are worn, for a first model (not illustrated), which is designed by setting the target addition power FAD corresponding to the target distance d at the fitting point FP, and a known ray tracing method is used for performing the vision simulation.

The ray tracing method is for calculating a path along which a ray entering the object side face of the lens emits through the eyeball side surface of the lens, and a point where the ray is focused, and in this embodiment, a simulation value SDD for the addition power at the fitting point FP of the first model is computed using the ray tracing method.

The simulation device 20 includes an input device (not illustrated) for inputting parameters and lens information other than parameters.

The parameters here include: the target addition power FAD, the prescription addition power ADD, a spherical power Sph of the first region 1A for providing the first power D1, a cylindrical power Cyl, a cylindrical axis direction Ax, a prism power Pr, a prism base direction PBE, a convex surface curve ABC, and a lens center thickness CT. The lens information includes: a refractive index n of the lens, and positions of the fitting point FP, the progression-start point PS, the progression-end point PE, the first measurement reference point P1, and the second measurement reference point P2.

Predetermined parameters are selected, values of the selected parameters are changed, and the vision simulation is performed a plurality of times.

The computer 30 is used for designing the progressive power lens based on the result obtained by the simulation device 20, and includes a processing unit 40 and an input unit 50.

The input unit 50 is for inputting various information of the progressive power lens to be designed, and the examples of the input unit include: a keyboard, an input unit of a personal computer and the like.

Input data that is input using the input unit 50 includes: the target addition power FAD, the prescription addition power ADD, the spherical power Sph of the first region 1A for providing the first power D1, the cylindrical power Cyl, the cylindrical axis direction Ax, the prism power Pr, the prism base direction PBE, the convex surface curve ABC, and the lens center thickness CT; and the lens information is the refractive index n of the lens, the positions of the fitting point FP, the progression-start point PS, the progression-end point PE, and the first measurement reference point P1 and the second measurement reference point P2, and other information required for lens design.

The processing unit 40 includes: an information acquiring unit 41, a computing unit 42, a storage unit 43, a control unit 44, and a design unit 45.

The information acquiring unit 41 acquires the simulation value SDD for the addition power at the fitting point FP, which is output from the simulation device 20 and the parameter values which were changed in simulation.

The computing unit 42 includes: a correction amount computing unit 421 configured to compute, for each simulation, a correction amount CDD, which is a difference between the simulation value SDD for the addition power at the fitting point FP and the target addition power FAD input by the input unit 50, based on information acquired by the information acquiring unit 41; and a relational expression computing unit 422 configured to compute a relational expression, which indicates the relationship between the correction amount CDD computed for each simulation and the parameter values changed in simulation, based on data from the correction amount computing unit 421.

The storage unit 43 includes: a correction amount storage unit 431 that stores the relationship between the parameters and the correction amount CDD based on a result computed by the correction amount computing unit 421; a relational expression storage unit 432 that stores the relationship between the parameters and the relational expression based on a computed result of the relational expression computing unit 422; and a basic information database 433.

The basic information data base 433 stores, for example, the position of the progression-start point PS, the position of the progression-end point PE, the position of the fitting point FP, and other basic information required for designing the lens.

The control unit 44 compares the information on the lens for actual designing, which is input by the input unit 50, with the information stored in the storage unit 43, and determines the correction amount CDD for designing a second model.

The design unit 45 designs a second model (not illustrated) by adding the correction amount CDD, determined by the control unit 44, to the target addition power FAD, which is set in the first model.

The designed second model is displayed on a display (not illustrated), or is printed by a printer (not illustrated).

Next, examples of the correction amount CDD determined by the correction amount computing unit 421 and the relational expression determined by the relational expression computing unit 422 will be described in detail with reference to Table 1 to Table 24 and FIG. 3 to FIG. 24. In this embodiment, the fitting point FP is set at the origin O of the Y axis (see FIG. 1A).

First the change in the correction amount CDD when the target addition power FAD is 1.00 diopters (D) and the prescription addition power ADD is changed with respect to the typical spherical power Sph of the first power D1 will be described based on S1 to S15.

Table 1 shows the simulation values SDD and the correction amounts CDD in the case when the spherical power Sph is −8.00 diopters (D), and the prescription addition power ADD is 2.50 diopters (D) (S1), 3.00 diopters (D) (S2), and 3.50 diopters (D) (S3). The simulation value SDD is an amount of the addition power at a position corresponding to the fitting point FP on the principal meridian. In the following table, the simulation values SDD and the correction amounts CDD are rounded off to two decimal places. This is the same for the following subsequent examples. The parameters required to determine the simulation value SDD are indicated in Table 1.

TABLE 1

|    | Sph   | Cyl  | Ax | ADD  | Pr   | PBE | ABC | CT  | FAD  | SDD  | CDD  |
|----|-------|------|----|------|------|-----|-----|-----|------|------|------|
| S1 | −8.00 | 0.00 | 0  | 2.50 | 1.80 | 270 | 1   | 1.1 | 1.00 | 0.76 | 0.24 |
| S2 | −8.00 | 0.00 | 0  | 3.00 | 2.15 | 270 | 1   | 1.1 | 1.00 | 0.76 | 0.24 |
| S3 | −8.00 | 0.00 | 0  | 3.50 | 2.50 | 270 | 1   | 1.1 | 1.00 | 0.76 | 0.24 |

Figure 3:
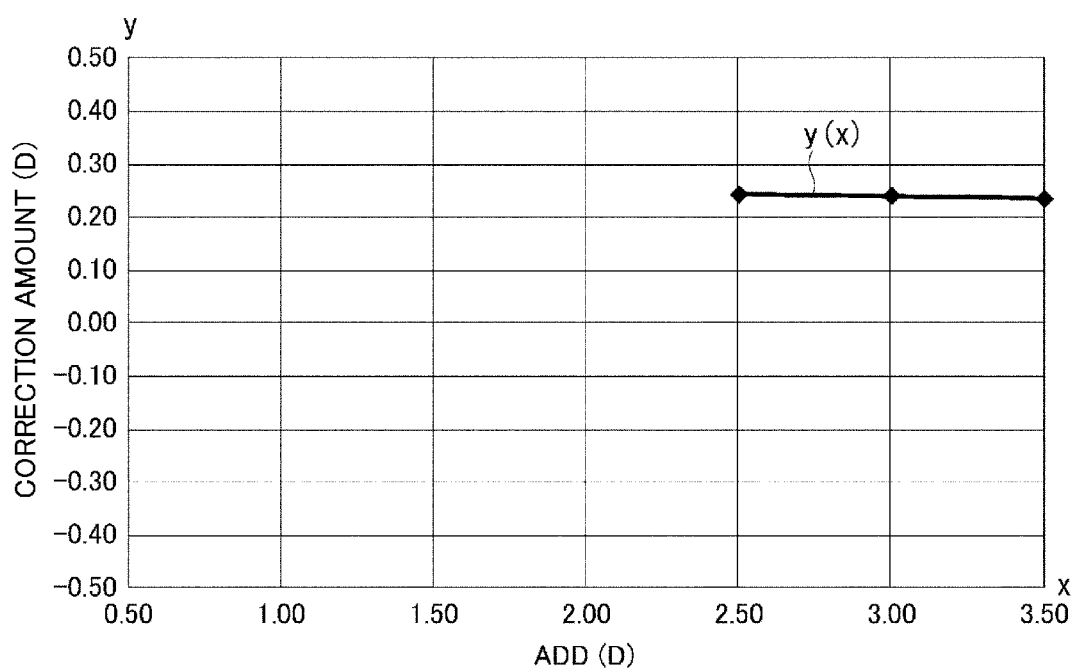
FIG. 3 is a graph depicting the relationship between the prescription addition power ADD and the correction amount.

The relational expression of the prescription addition power ADD and the correction amount CDD can be determined as a polynomial approximate expression. In other words, if there are a plurality of points which represent the correspondence between the prescription addition power ADD and the correction amount CDD, the relational expression can be determined by estimating the locus of these points. In the embodiment, when the prescription addition power ADD is x and the correction amount CDD is y, the relational expression y(x) is $$y=-0.0052x^2+0.0226x+0.2206,$$

and this relational expression y(x) and the computing result are depicted in FIG. 3.

As an example when the spherical power Sph is −4.00 diopters (D) and the prescription addition power ADD is changed, Table 2 shows the simulation values SDD and the correction amounts CDD in cases when the prescription addition power ADD is 2.50 diopters (D) (S4), 3.00 diopters (D) (S5), and 3.50 diopters (D) (S3). The parameters required to determine the simulation value SDD are indicated in Table 2.

TABLE 2

|    | Sph   | Cyl  | Ax | ADD  | Pr   | PBE | ABC | CT  | FAD  | SDD  | CDD  |
|----|-------|------|----|------|------|-----|-----|-----|------|------|------|
| S4 | −4.00 | 0.00 | 0  | 2.50 | 1.80 | 270 | 2.5 | 1.1 | 1.00 | 0.91 | 0.09 |
| S5 | −4.00 | 0.00 | 0  | 3.00 | 2.15 | 270 | 2.5 | 1.1 | 1.00 | 0.92 | 0.08 |
| S6 | −4.00 | 0.00 | 0  | 3.50 | 2.50 | 270 | 2.5 | 1.1 | 1.00 | 0.94 | 0.06 |

Figure 4:
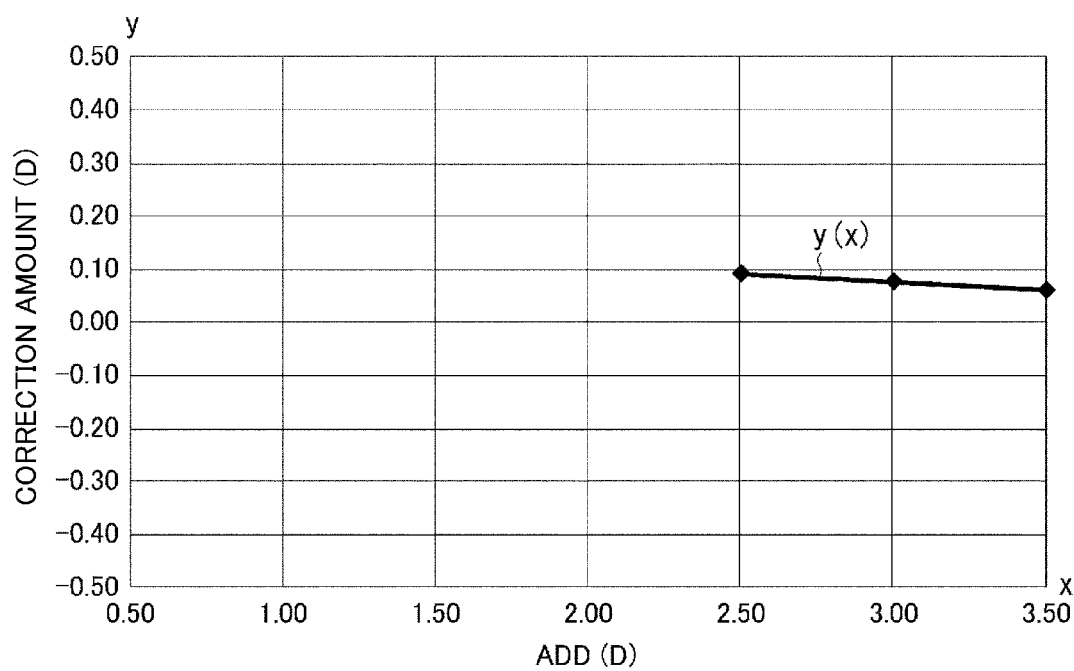
FIG. 4 is a graph depicting the relationship between the prescription addition power ADD and the correction amount.

When the prescription addition power ADD is x and the correction amount CDD is y, the relational expression y(x) is $$y=-0.0031x^2-0.0128x+0.1449,$$

and this relational expression y(x) and the computing result are depicted in FIG. 4.

Table 3 shows the simulation values SDD and the correction amounts CDD in the case when the spherical power Sph is 0.00 diopters (D) and the prescription addition power ADD is 2.50 diopters (D) (S7), 3.00 diopters (D) (S8), and 3.50 diopters (D) (S9). The parameters required to determine the simulation values SDD are indicated in Table 3.

TABLE 3

|    | Sph  | Cyl  | Ax | ADD  | Pr   | PBE | ABC | CT  | FAD  | SDD  | CDD   |
|----|------|------|----|------|------|-----|-----|-----|------|------|-------|
| S7 | 0.00 | 0.00 | 0  | 2.50 | 1.80 | 270 | 4   | 2.3 | 1.00 | 1.11 | −0.11 |
| S8 | 0.00 | 0.00 | 0  | 3.00 | 2.15 | 270 | 4   | 2.4 | 1.00 | 1.14 | −0.14 |
| S9 | 0.00 | 0.00 | 0  | 3.50 | 2.50 | 270 | 4   | 2.5 | 1.00 | 1.17 | −0.17 |

Figure 5:
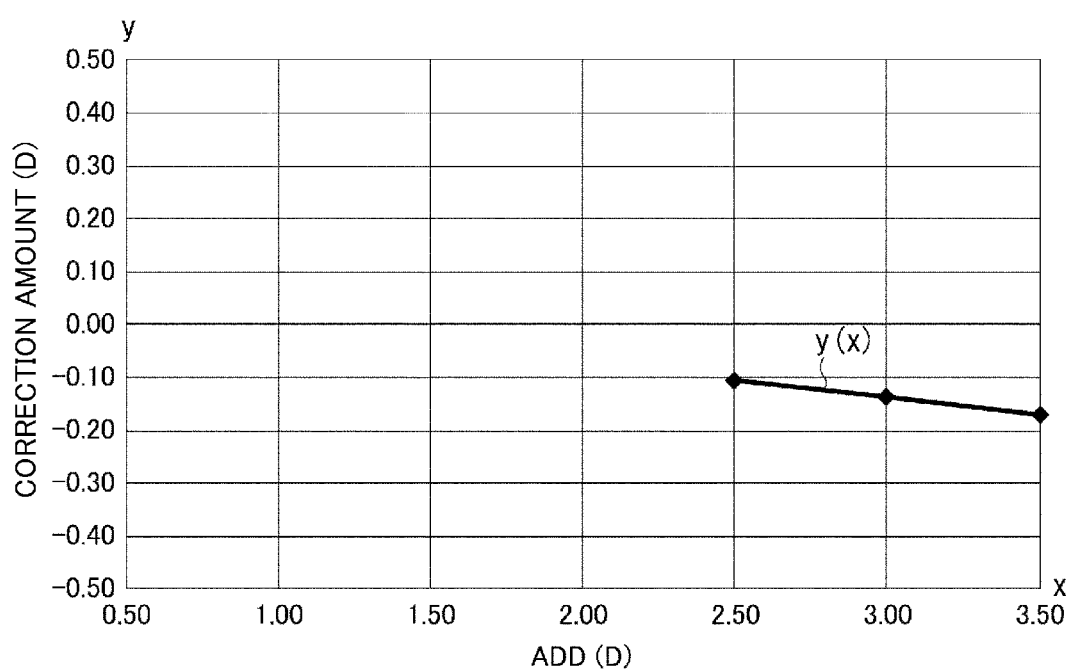
FIG. 5 is a graph depicting the relationship between the prescription addition power ADD and the correction amount.

When the prescription addition power ADD is x and the correction amount CDD is y, the relational expression y(x) is $$y=-0.0055x^2-0.032x+0.0088$$

and this relational expression y(x) and the computing result are depicted in FIG. 5.

Table 4 shows the simulation values SDD and the correction amounts CDD in the case when the spherical power Sph is 4.00 diopters (D) and the prescription addition power ADD is 2.50 diopters (D) (S10), 3.00 diopters (D) (S11), and 3.50 diopters (D) (S12). The parameters required to determine the simulation value SDD are indicated in Table 4.

TABLE 4

|  | Sph | Cyl | Ax | ADD | Pr | PBE | ABC | CT | FAD | SDD | CDD |
|---|---|---|---|---|---|---|---|---|---|---|---|
| S10 | 4.00 | 0.00 | 0 | 2.50 | 1.80 | 270 | 7 | 5.3 | 1.00 | 1.26 | −0.26 |
| S11 | 4.00 | 0.00 | 0 | 3.00 | 2.15 | 270 | 8 | 5.7 | 1.00 | 1.28 | −0.28 |
| S12 | 4.00 | 0.00 | 0 | 3.50 | 2.50 | 270 | 8 | 5.9 | 1.00 | 1.35 | −0.35 |

Figure 6:
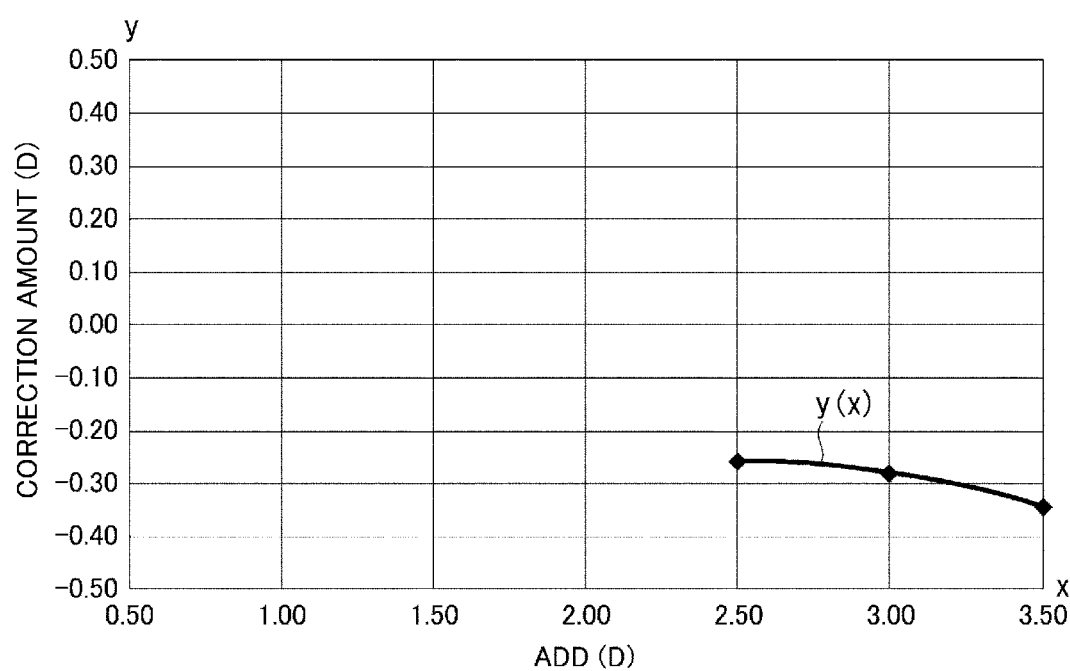
FIG. 6 is a graph depicting the relationship between the prescription addition power ADD and the correction amount.

When the prescription addition power ADD is x and the correction amount CDD is y, the relational expression y(x) is $$y = -0.0809x^2 + 0.399x - 0.7505$$

and this relational expression y(x) and the computing result are depicted in FIG. 6.

Table 5 shows the simulation values SDD and the correction amounts CDD in the case when the spherical power Sph is 6.00 diopters (D) and the prescription addition power ADD is 2.50 diopters (D) (S13), 3.00 diopters (D) (S14), and 3.50 diopters (D) (S15). The parameters required to determine the simulation value SDD are indicated in Table 5.

TABLE 5

|  | Sph | Cyl | Ax | ADD | Pr | PBE | ABC | CT | FAD | SDD | CDD |
|---|---|---|---|---|---|---|---|---|---|---|---|
| S13 | 6.00 | 0.00 | 0 | 2.50 | 1.80 | 270 | 9 | 6.3 | 1.00 | 1.32 | −0.32 |
| S14 | 6.00 | 0.00 | 0 | 3.00 | 2.15 | 270 | 10 | 6.7 | 1.00 | 1.35 | −0.35 |
| S15 | 6.00 | 0.00 | 0 | 3.50 | 2.50 | 270 | 10 | 6.9 | 1.00 | 1.43 | −0.43 |

Figure 7:
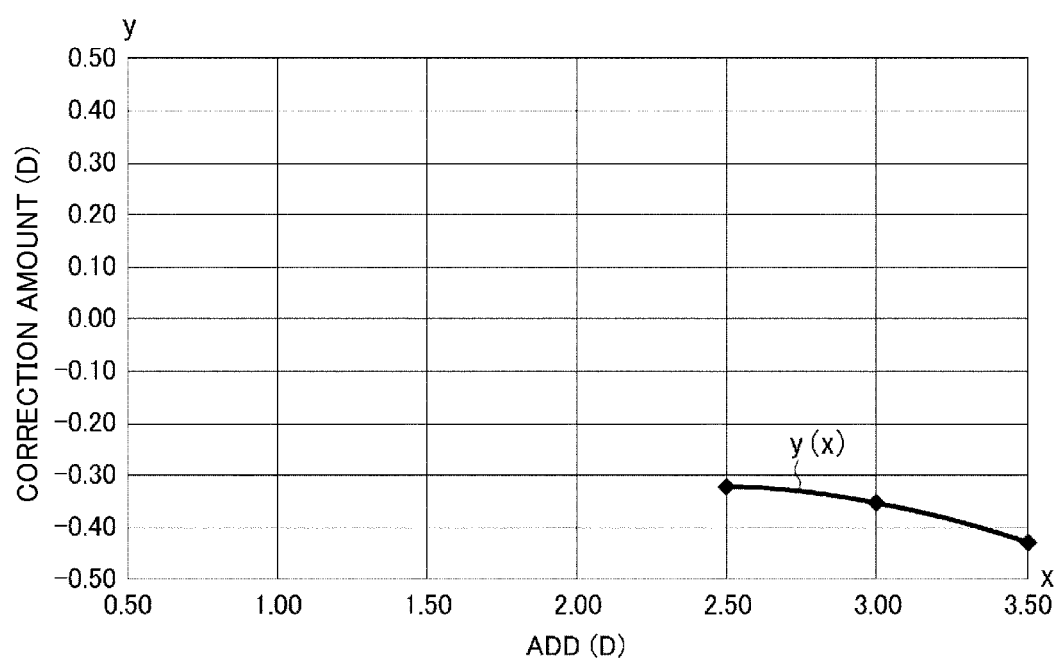
FIG. 7 is a graph depicting the relationship between the prescription addition power ADD and the correction amount.

When the prescription addition power ADD is x and the correction amount CDD is y, the relational expression y(x) is $$y = -0.0714x^2 + 0.3188x - 0.6673,$$

and this relational expression y(x) and the computing result are depicted in FIG. 7.

Next the change in the correction amount CDD, when the target addition power FAD is 0.50 diopters (D) and the prescription addition power ADD is changed with respect to the typical spherical power Sph of the first power D1, will be described based on S16 to S40.

Table 6 shows the simulation values SDD and the correction amounts CDD in the case when the spherical power Sph is −8.00 diopters (D) and the prescription addition power ADD is 1.50 diopters (D) (S16), 2.0 diopters (D) (S17), 2.50 diopters (D) (S18), 3.00 diopters (D) (S19), and 3.50 diopters (D) (S20).

Further, the parameters required to determine the simulation value SDD are indicated in Table 6.

TABLE 6

|  | Sph | Cyl | Ax | ADD | Pr | PBE | ABC | CT | FAD | SDD | CDD |
|---|---|---|---|---|---|---|---|---|---|---|---|
| S16 | −8.00 | 0.00 | 0 | 1.50 | 1.10 | 270 | 1 | 1.1 | 0.50 | 0.28 | 0.22 |
| S17 | −8.00 | 0.00 | 0 | 2.00 | 1.45 | 270 | 1 | 1.1 | 0.50 | 0.28 | 0.22 |
| S18 | −8.00 | 0.00 | 0 | 2.50 | 1.80 | 270 | 1 | 1.1 | 0.50 | 0.28 | 0.22 |
| S19 | −8.00 | 0.00 | 0 | 3.00 | 2.15 | 270 | 1 | 1.1 | 0.50 | 0.28 | 0.22 |
| S20 | −8.00 | 0.00 | 0 | 3.50 | 2.50 | 270 | 1 | 1.1 | 0.50 | 0.28 | 0.22 |

Figure 8:
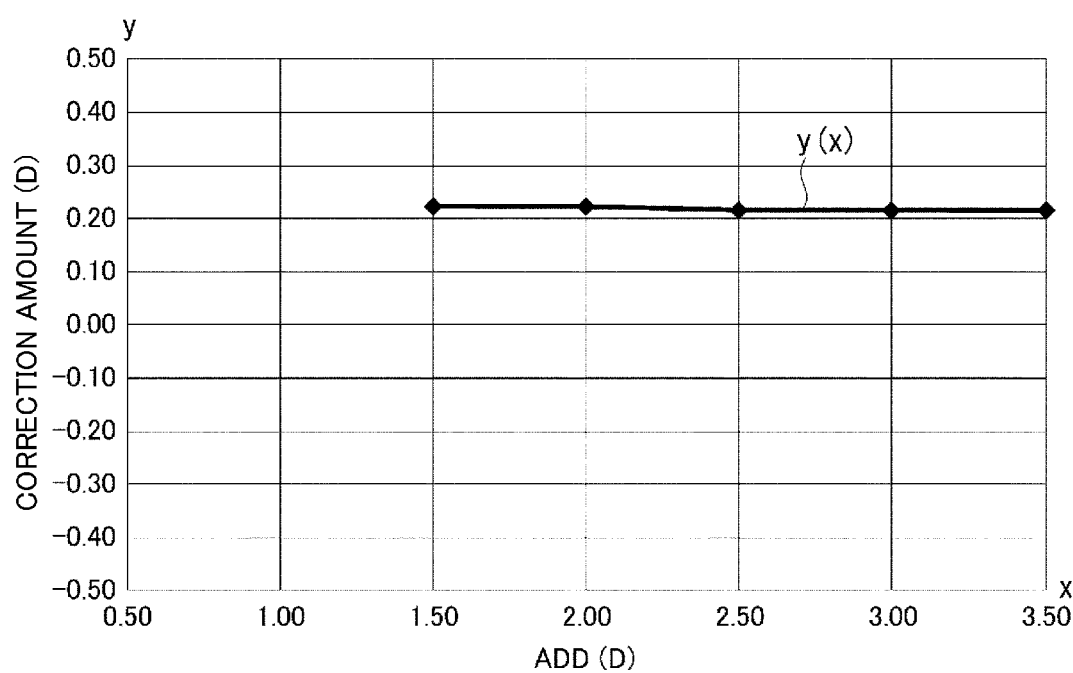
FIG. 8 is a graph depicting the relationship between the prescription addition power ADD and the correction amount.

When the prescription addition power ADD is x and the correction amount CDD is y, the relational expression y(x) is $$y = 0.0004x^2 - 0.0065x + 0.2338,$$

and this relational expression y(x) and the computing result are depicted in FIG. 8.

Table 7 shows the simulation values SDD and the correction amounts CDD in the case when the spherical power Sph is −4.00 diopters (D) and the prescription addition power ADD is 1.50 diopters (D) (S21), 2.00 diopters (D) (S22), 2.50 diopters (D) (S23), 3.00 diopters (D) (S24), and 3.50 diopters (D) (S25).

Further, the parameters required to determine the simulation value SDD are indicated in Table 7.

TABLE 7

|  | Sph | Cyl | Ax | ADD | Pr | PBE | ABC | CT | FAD | SDD | CDD |
|---|---|---|---|---|---|---|---|---|---|---|---|
| S21 | −4.00 | 0.00 | 0 | 1.50 | 1.10 | 270 | 2.5 | 1.1 | 0.50 | 0.40 | 0.10 |
| S22 | −4.00 | 0.00 | 0 | 2.00 | 1.45 | 270 | 2.5 | 1.1 | 0.50 | 0.41 | 0.09 |
| S23 | −4.00 | 0.00 | 0 | 2.50 | 1.80 | 270 | 2.5 | 1.1 | 0.50 | 0.43 | 0.07 |
| S24 | −4.00 | 0.00 | 0 | 3.00 | 2.15 | 270 | 2.5 | 1.1 | 0.50 | 0.44 | 0.06 |
| S25 | −4.00 | 0.00 | 0 | 3.50 | 2.50 | 270 | 2.5 | 1.1 | 0.50 | 0.45 | 0.05 |

Figure 9:
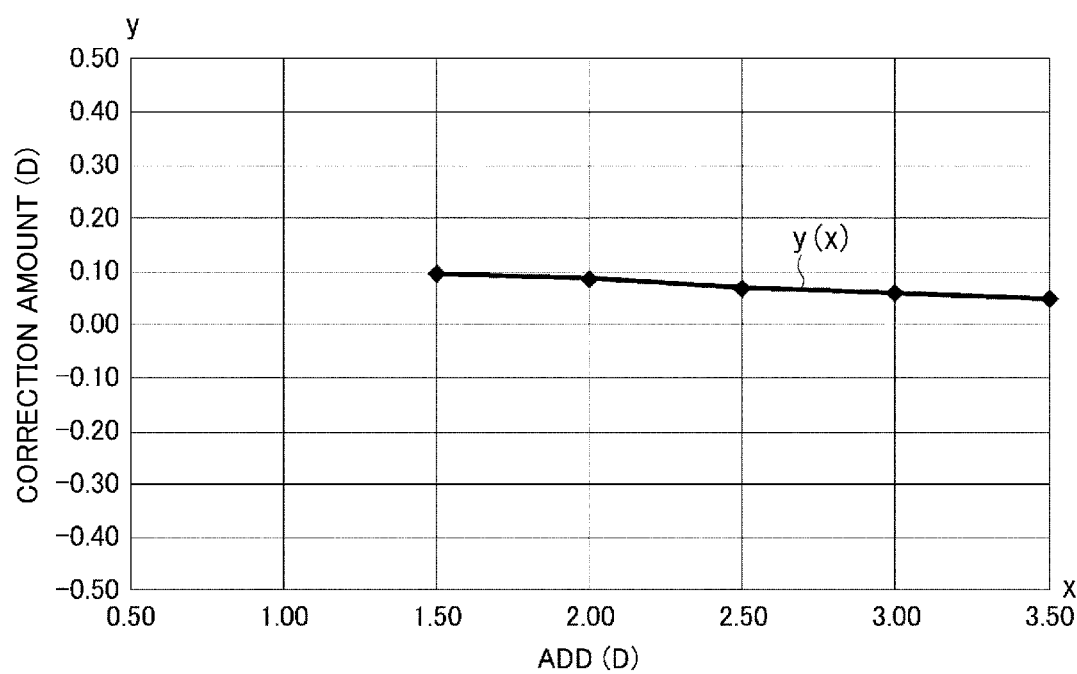
FIG. 9 is a graph depicting the relationship between the prescription addition power ADD and the correction amount.

When the prescription addition power ADD is x and the correction amount CDD is y, the relational expression y(x) is $$y=0.0027x^2-0.0373x+0.1521$$

and this relational expression y(x) and the computing result are depicted in FIG. 9.

Table 8 shows the simulation values SDD and the correction amounts CDD in the case when the spherical power Sph is 0.00 diopters (D) and the prescription addition power ADD is 1.50 diopters (D) (S26), 2.00 diopters (D) (S27), 2.5 diopters (D) (S28), 3.00 diopters (D) (S29), and 3.50 diopters (D) (S30). Further, the parameters required to determine the simulation value SDD are indicated in Table 8.

TABLE 8

|  | Sph | Cyl | Ax | ADD | Pr | PBE | ABC | CT | FAD | SDD | CDD |
|---|---|---|---|---|---|---|---|---|---|---|---|
| S26 | 0.00 | 0.00 | 0 | 1.50 | 1.10 | 270 | 4 | 2 | 0.50 | 0.55 | −0.05 |
| S27 | 0.00 | 0.00 | 0 | 2.00 | 1.45 | 270 | 4 | 2.2 | 0.50 | 0.57 | −0.07 |
| S28 | 0.00 | 0.00 | 0 | 2.50 | 1.80 | 270 | 4 | 2.3 | 0.50 | 0.60 | −0.10 |
| S29 | 0.00 | 0.00 | 0 | 3.00 | 2.15 | 270 | 4 | 2.4 | 0.50 | 0.63 | −0.13 |
| S30 | 0.00 | 0.00 | 0 | 3.50 | 2.50 | 270 | 4 | 2.5 | 0.50 | 0.65 | −0.15 |

Figure 10:
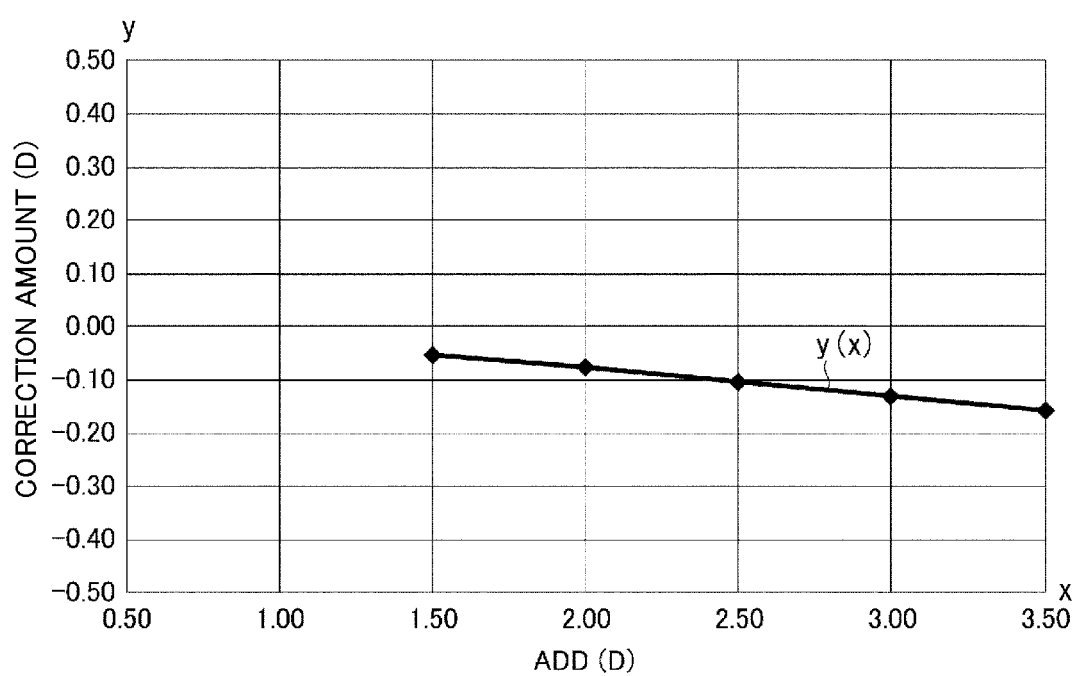
FIG. 10 is a graph depicting the relationship between the prescription addition power ADD and the correction amount.

When the prescription addition power ADD is x and the correction amount CDD is y, the relational expression y(x) is $$y=0.0012x^2-0.0608x+0.0428,$$

and this relational expression y(x) and the computing result are depicted in FIG. 10.

Table 9 shows the simulation values SDD and the correction amounts CDD in the case when the spherical power Sph is 4.00 diopters (D) and the prescription addition power ADD is 1.50 diopters (D) (S31), 2.00 diopters (D) (S32), 2.50 diopters (D) (S33), 3.00 diopters (D) (S34), and 3.50 diopters (D) (S35). Further, the parameters required to determine the simulation value SDD are indicated in Table 9.

TABLE 9

|  | Sph | Cyl | Ax | ADD | Pr | PBE | ABC | CT | FAD | SDD | CDD |
|---|---|---|---|---|---|---|---|---|---|---|---|
| S31 | 4.00 | 0.00 | 0 | 1.50 | 1.10 | 270 | 6 | 4.7 | 0.50 | 0.69 | −0.19 |
| S32 | 4.00 | 0.00 | 0 | 2.00 | 1.45 | 270 | 7 | 5.1 | 0.50 | 0.72 | −0.22 |
| S33 | 4.00 | 0.00 | 0 | 2.50 | 1.80 | 270 | 7 | 5.3 | 0.50 | 0.78 | −0.28 |
| S34 | 4.00 | 0.00 | 0 | 3.00 | 2.15 | 270 | 8 | 5.7 | 0.50 | 0.81 | −0.31 |
| S35 | 4.00 | 0.00 | 0 | 3.50 | 2.50 | 270 | 8 | 5.9 | 0.50 | 0.87 | −0.37 |

Figure 11:
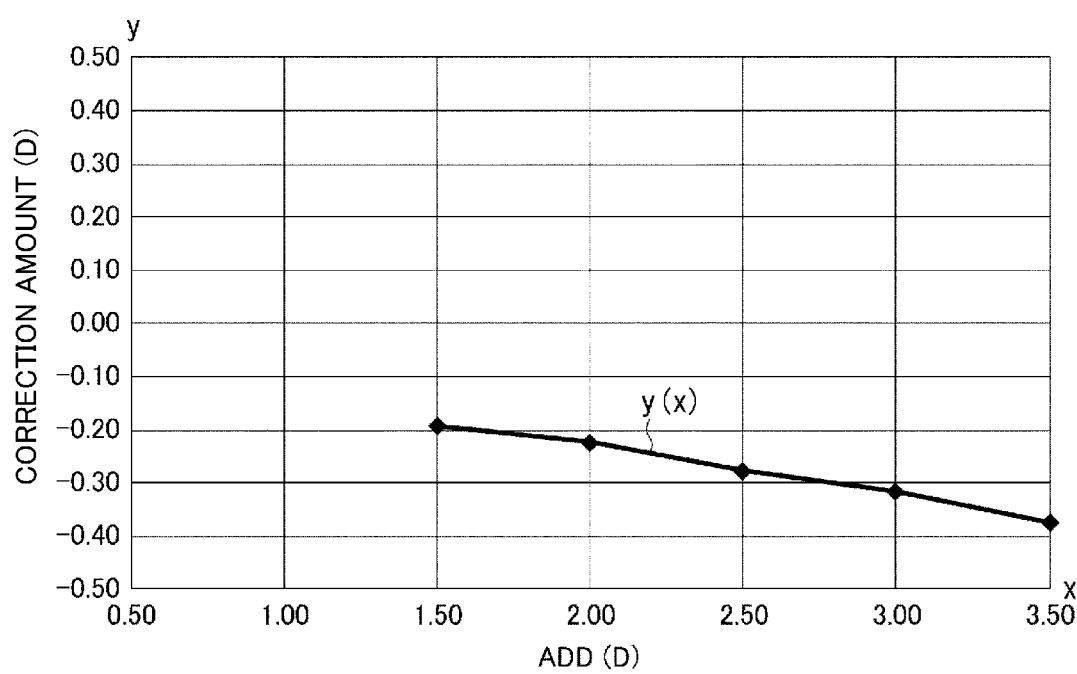
FIG. 11 is a graph depicting the relationship between the prescription addition power ADD and the correction amount.

When the prescription addition power ADD is x and the correction amount CDD is y, the relational expression y(x) is $$y=-0.0073x^2-0.0553x-0.0864,$$

and this relational expression y(x) and the computing result are depicted in FIG. 11.

Table 10 shows the simulation values SDD and the correction amounts CDD in the case when the spherical power Sph is 6.00 diopters (D) and the prescription addition power ADD is 1.50 diopters (D) (S36), 2.00 diopters (D) (S37), 2.50 diopters (D) (S38), 3.00 diopters (D) (S39), and 3.50 diopters (D) (S40).

Further, the parameters required to determine the simulation values SDD are indicated in Table 10.

TABLE 10

|  | Sph | Cyl | Ax | ADD | Pr | PBE | ABC | CT | FAD | SDD | CDD |
|---|---|---|---|---|---|---|---|---|---|---|---|
| S36 | 6.00 | 0.00 | 0 | 1.50 | 1.10 | 270 | 8 | 5.8 | 0.50 | 0.74 | −0.24 |
| S37 | 6.00 | 0.00 | 0 | 2.00 | 1.45 | 270 | 9 | 6.2 | 0.50 | 0.79 | −0.29 |
| S38 | 6.00 | 0.00 | 0 | 2.50 | 1.80 | 270 | 9 | 6.3 | 0.50 | 0.85 | −0.35 |
| S39 | 6.00 | 0.00 | 0 | 3.00 | 2.15 | 270 | 10 | 6.7 | 0.50 | 0.90 | −0.40 |
| S40 | 6.00 | 0.00 | 0 | 3.50 | 2.50 | 270 | 10 | 6.9 | 0.50 | 0.97 | −0.47 |

Figure 12:
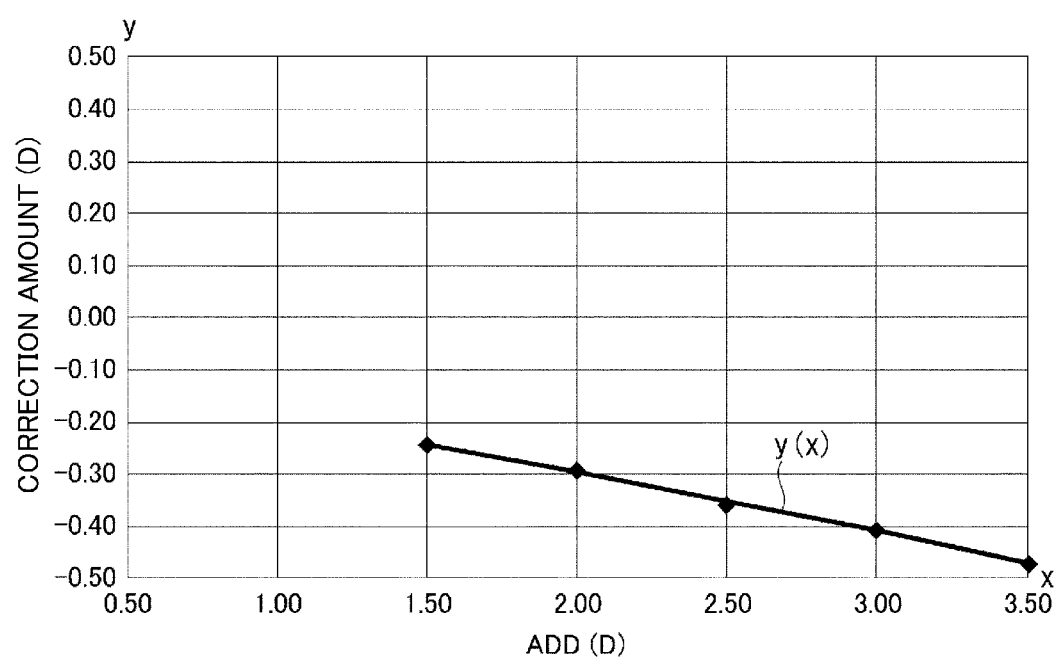
FIG. 12 is a graph depicting the relationship between the prescription addition power ADD and the correction amount.

When the prescription addition power ADD is x and the correction amount CDD is y, the relational expression y(x) is $$y = -0.0051x^2 - 0.088x - 0.0974,$$

and this relational expression y(x) and the computing result are depicted in FIG. 12.

Next the change in the correction amount CDD, when the target addition power FAD is 1.00 diopters (D) and the cylindrical power Cyl is changed with respect to a typical cylindrical axis direction Ax, will be described based on S41 to S76.

Table 11 shows the simulation values SDD and the correction amounts CDD in the case when the cylindrical power Cyl is 0.00 diopters (D) (S41), −0.50 diopters (D) (S42), −1.00 diopters (D) (S43), −1.50 diopters (D) (S44), −2.00 diopters (D) (S45), −2.50 diopters (D) (S46), −3.00 diopters (D) (S47), −3.50 diopters (D) (S48), and −4.00 diopters (D) (S49). Further, the parameters required to determine the simulation value SDD are indicated in Table 11.

TABLE 11

|  | Sph | Cyl | Ax | ADD | Pr | PBE | ABC | CT | FAD | SDD | CDD |
|---|---|---|---|---|---|---|---|---|---|---|---|
| S41 | 0.00 | 0.00 | 0 | 3.00 | 2.15 | 270 | 4 | 2.4 | 1.00 | 1.14 | −0.14 |
| S42 | 0.00 | −0.50 | 0 | 3.00 | 2.15 | 270 | 4 | 2.3 | 1.00 | 1.11 | −0.11 |
| S43 | 0.00 | −1.00 | 0 | 3.00 | 2.15 | 270 | 4 | 2.3 | 1.00 | 1.09 | −0.09 |
| S44 | 0.00 | −1.50 | 0 | 3.00 | 2.15 | 270 | 4 | 2.3 | 1.00 | 1.07 | −0.07 |
| S45 | 0.00 | −2.00 | 0 | 3.00 | 2.15 | 270 | 4 | 2.3 | 1.00 | 1.04 | −0.04 |
| S46 | 0.00 | −2.50 | 0 | 3.00 | 2.15 | 270 | 4 | 2.3 | 1.00 | 1.02 | −0.02 |
| S47 | 0.00 | −3.00 | 0 | 3.00 | 2.15 | 270 | 4 | 2.4 | 1.00 | 1.00 | 0.00 |
| S48 | 0.00 | −3.50 | 0 | 3.00 | 2.15 | 270 | 4 | 2.4 | 1.00 | 0.97 | 0.03 |
| S49 | 0.00 | −4.00 | 0 | 3.00 | 2.15 | 270 | 4 | 2.4 | 1.00 | 0.95 | 0.05 |

Figure 13:
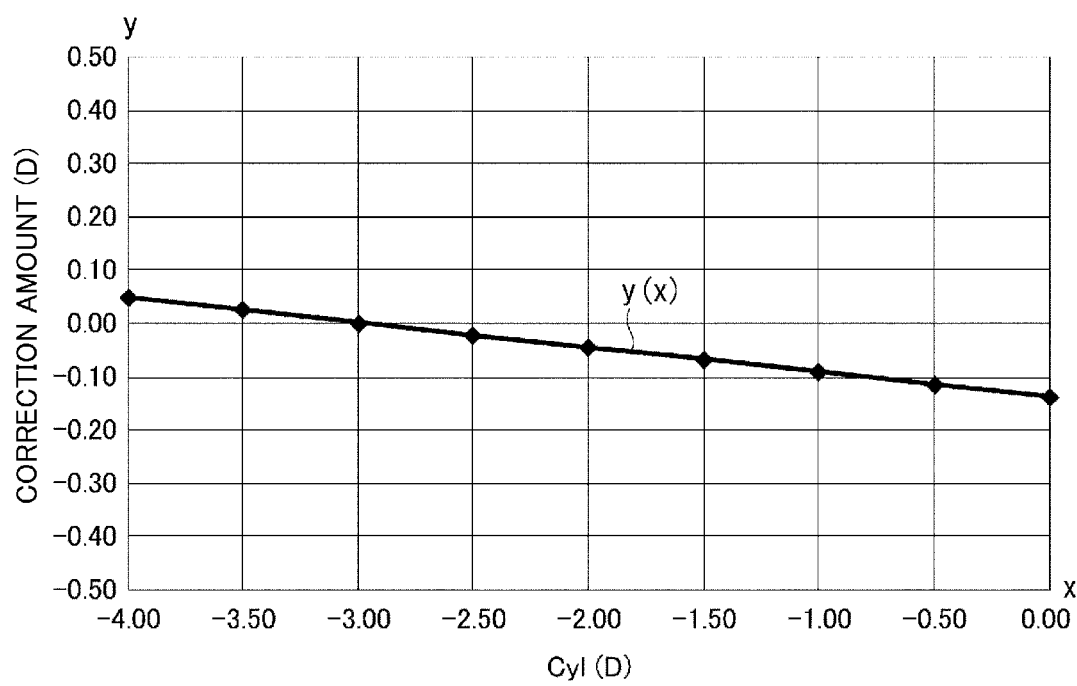
FIG. 13 is a graph depicting the relationship between the cylindrical power Cyl and the correction amount.

When the cylindrical power Cyl is x and the correction amount CDD is y, the relational expression y(x) is $$y = 0.0001x^2 - 0.0464x - 0.1359,$$

and this relational expression y(x) and the computing result are depicted in FIG. 13.

Table 12 shows the simulation values SDD and the correction amounts CDD in the case when the cylindrical axis direction Ax is 45° and the cylindrical power Cyl is 0.00 diopters (D) (S50), −0.50 diopters (D) (S51), −1.00 diopters (D) (S52), −1.50 diopters (D) (S53), −2.00 diopters (D) (S54), −2.50 diopters (D) (S55), −3.00 diopters (D) (S56), −3.50 diopters (D) (S57), and −4.00 diopters (D) (S58).

Further, the parameters required to determine the simulation value SDD are indicated in Table 12.

TABLE 12

|  | Sph | Cyl | Ax | ADD | Pr | PBE | ABC | CT | FAD | SDD | CDD |
|---|---|---|---|---|---|---|---|---|---|---|---|
| S50 | 0.00 | 0.00 | 45 | 3.00 | 2.15 | 270 | 4 | 2.4 | 1.00 | 1.14 | −0.14 |
| S51 | 0.00 | −0.50 | 45 | 3.00 | 2.15 | 270 | 4 | 2.4 | 1.00 | 1.12 | −0.12 |
| S52 | 0.00 | −1.00 | 45 | 3.00 | 2.15 | 270 | 4 | 2.4 | 1.00 | 1.11 | −0.11 |
| S53 | 0.00 | −1.50 | 45 | 3.00 | 2.15 | 270 | 4 | 2.5 | 1.00 | 1.09 | −0.09 |
| S54 | 0.00 | −2.00 | 45 | 3.00 | 2.15 | 270 | 4 | 2.5 | 1.00 | 1.08 | −0.08 |
| S55 | 0.00 | −2.50 | 45 | 3.00 | 2.15 | 270 | 4 | 2.5 | 1.00 | 1.06 | −0.06 |
| S56 | 0.00 | −3.00 | 45 | 3.00 | 2.15 | 270 | 4 | 2.5 | 1.00 | 1.05 | −0.05 |
| S57 | 0.00 | −3.50 | 45 | 3.00 | 2.15 | 270 | 4 | 2.5 | 1.00 | 1.03 | −0.03 |
| S58 | 0.00 | −4.00 | 45 | 3.00 | 2.15 | 270 | 4 | 2.5 | 1.00 | 1.02 | −0.02 |

Figure 14:
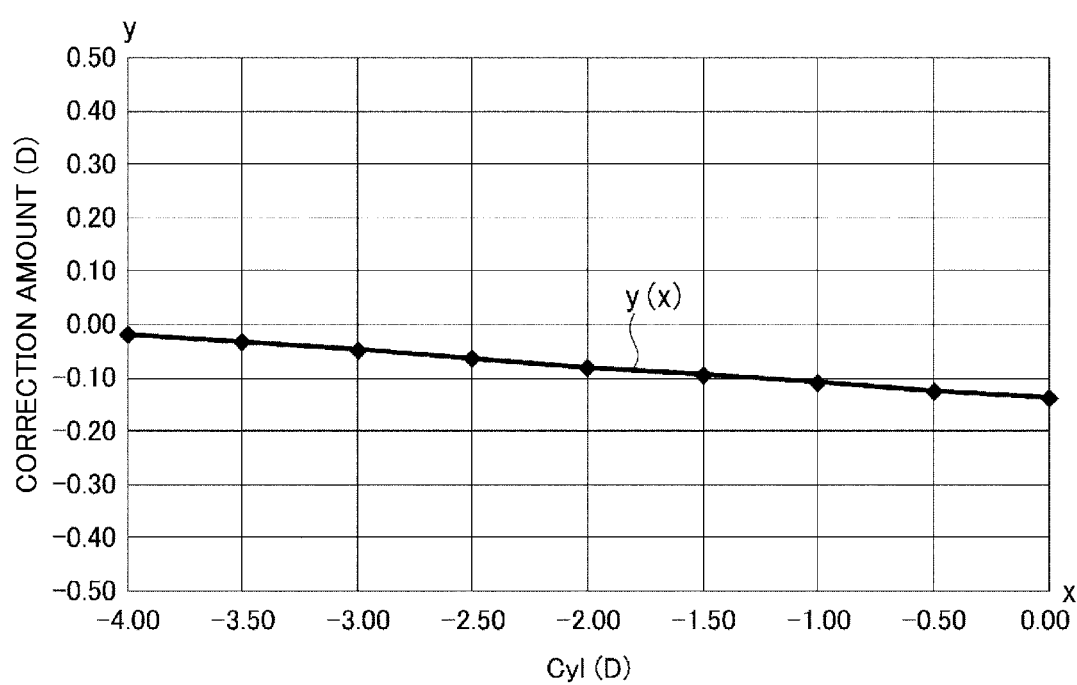
FIG. 14 is a graph depicting the relationship between the cylindrical power Cyl and the correction amount.

When the cylindrical power Cyl is x and the correction amount CDD is y, the relational expression y(x) is $y=-0.0003x^2-0.0308x-0.1364$, and this relational expression y(x) and the computing result are depicted in FIG. 14.

Table 13 shows the simulation values SDD and the correction amounts CDD when the cylindrical axis direction Ax is 90° and the cylindrical power Cyl is 0.00 diopters (d) (S59), −0.50 diopters (D) (S60), −1.00 diopters (D) (S61), −1.50 diopters (D) (S62), −2.00 diopters (D) (S63), −2.50 diopters (D) (S64), −3.00 diopters (D) (S65), −3.50 diopters (D) (S66), and −4.00 diopters (D) (S67).

Further, the parameters required to determine the simulation value SDD are indicated in Table 13.

TABLE 13

| | Sph | Cyl | Ax | ADD | Pr | PBE | ABC | CT | FAD | SDD | CDD |
|---|---|---|---|---|---|---|---|---|---|---|---|
| S59 | 0.00 | 0.00 | 90 | 3.00 | 2.15 | 270 | 4 | 2.4 | 1.00 | 1.14 | −0.14 |
| S60 | 0.00 | −0.50 | 90 | 3.00 | 2.15 | 270 | 4 | 2.4 | 1.00 | 1.13 | −0.13 |
| S61 | 0.00 | −1.00 | 90 | 3.00 | 2.15 | 270 | 4 | 2.4 | 1.00 | 1.12 | −0.12 |
| S62 | 0.00 | −1.50 | 90 | 3.00 | 2.15 | 270 | 4 | 2.4 | 1.00 | 1.12 | −0.12 |
| S63 | 0.00 | −2.00 | 90 | 3.00 | 2.15 | 270 | 4 | 2.4 | 1.00 | 1.11 | −0.11 |
| S64 | 0.00 | −2.50 | 90 | 3.00 | 2.15 | 270 | 4 | 2.4 | 1.00 | 1.11 | −0.11 |
| S65 | 0.00 | −3.00 | 90 | 3.00 | 2.15 | 270 | 4 | 2.4 | 1.00 | 1.10 | −0.10 |
| S66 | 0.00 | −3.50 | 90 | 3.00 | 2.15 | 270 | 4 | 2.4 | 1.00 | 1.09 | −0.09 |
| S67 | 0.00 | −4.00 | 90 | 3.00 | 2.15 | 270 | 4 | 2.4 | 1.00 | 1.09 | −0.09 |

Figure 15:
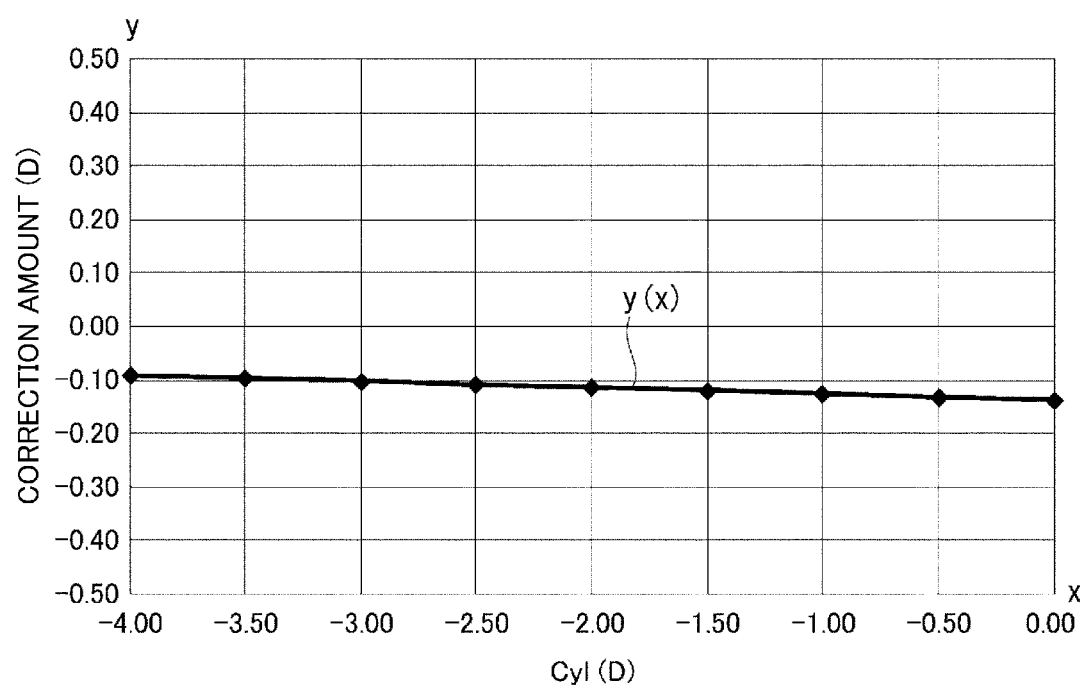
FIG. 15 is a graph depicting the relationship between the cylindrical power Cyl and the correction amount.

When the cylindrical power Cyl is x and the correction amount CDD is y, the relational expression y(x) is $y=-0.0002x^2-0.0127x-0.1367$, and this relational expression y(x) and the computing result are depicted in FIG. 15.

Table 14 shows the simulation values SDD and the correction amounts CDD in the case when the cylindrical axis direction Ax is 135° and the cylindrical power Cyl is 0.00 diopters (D) (S68), −0.50 diopters (D) (S69), −1.00 diopters (D) (S70), −1.50 diopters (D) (S71), −2.00 diopters (D) (S72), −2.50 diopters (D) (S73), −3.00 diopters (D) (S74), −3.50 diopters (D) (S75), and −4.00 diopters (D) (S76).

Further, the parameters required to determine the simulation value SDD are indicated in Table 14.

TABLE 14

| | Sph | Cyl | Ax | ADD | Pr | PBE | ABC | CT | FAD | SDD | CDD |
|---|---|---|---|---|---|---|---|---|---|---|---|
| S68 | 0.00 | 0.00 | 135 | 3.00 | 2.15 | 270 | 4 | 2.4 | 1.00 | 1.14 | −0.14 |
| S69 | 0.00 | −0.50 | 135 | 3.00 | 2.15 | 270 | 4 | 2.4 | 1.00 | 1.12 | −0.12 |
| S70 | 0.00 | −1.00 | 135 | 3.00 | 2.15 | 270 | 4 | 2.4 | 1.00 | 1.11 | −0.11 |
| S71 | 0.00 | −1.50 | 135 | 3.00 | 2.15 | 270 | 4 | 2.5 | 1.00 | 1.10 | −0.10 |
| S72 | 0.00 | −2.00 | 135 | 3.00 | 2.15 | 270 | 4 | 2.5 | 1.00 | 1.09 | −0.09 |
| S73 | 0.00 | −2.50 | 135 | 3.00 | 2.15 | 270 | 4 | 2.5 | 1.00 | 1.07 | −0.07 |
| S74 | 0.00 | −3.00 | 135 | 3.00 | 2.15 | 270 | 4 | 2.5 | 1.00 | 1.06 | −0.06 |
| S75 | 0.00 | −3.50 | 135 | 3.00 | 2.15 | 270 | 4 | 2.6 | 1.00 | 1.05 | −0.05 |
| S76 | 0.00 | −4.00 | 135 | 3.00 | 2.15 | 270 | 4 | 2.6 | 1.00 | 1.04 | −0.04 |

Figure 16:
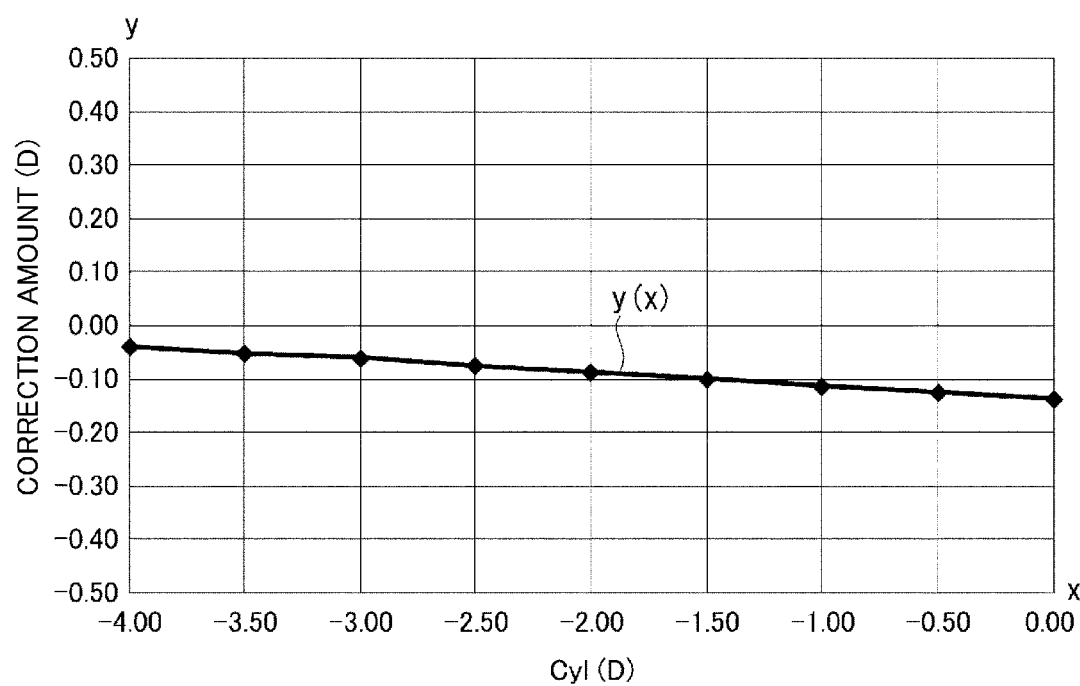
FIG. 16 is a graph depicting the relationship between the cylindrical power Cyl and the correction amount.

When the cylindrical power Cyl is x and the correction amount CDD is y, the relational expression y(x) is $y=-0.0006x^2-0.0268x-0.1367$, and this relational expression and the computing result are depicted in FIG. 16.

Next the change in the correction amount CDD, when the target addition power FAD is 0.50 diopters (D) and the cylindrical power Cyl is changed with respect to the typical cylindrical axis direction Ax, will be described based on S77 to S112.

Table 15 shows the simulation values SDD and the correction amounts CDD in the case when the cylindrical axis direction Ax is 0° and the cylindrical power Cyl is 0.00 diopters (D) (S77), −0.50 diopters (D) (S78), −1.00 diopters (D) (S79), −1.50 diopters (D) (S80), −2.00 diopters (D) (S81), −2.50 diopters (D) (S82), −3.00 diopters (D) (S83), −3.50 diopters (D) (S84), and −4.00 diopters (D) (S85).

Further, the parameters required to determine the simulation value SDD are indicated in Table 15.

TABLE 15

|  | Sph | Cyl | Ax | ADD | Pr | PBE | ABC | CT | FAD | SDD | CDD |
|---|---|---|---|---|---|---|---|---|---|---|---|
| S77 | 0.00 | 0.00 | 0 | 3.00 | 2.15 | 270 | 4 | 2.4 | 0.50 | 0.63 | −0.13 |
| S78 | 0.00 | −0.50 | 0 | 3.00 | 2.15 | 270 | 4 | 2.3 | 0.50 | 0.61 | −0.11 |
| S79 | 0.00 | −1.00 | 0 | 3.00 | 2.15 | 270 | 4 | 2.3 | 0.50 | 0.59 | −0.09 |
| S80 | 0.00 | −1.50 | 0 | 3.00 | 2.15 | 270 | 4 | 2.3 | 0.50 | 0.57 | −0.07 |
| S81 | 0.00 | −2.00 | 0 | 3.00 | 2.15 | 270 | 4 | 2.3 | 0.50 | 0.55 | −0.05 |
| S82 | 0.00 | −2.50 | 0 | 3.00 | 2.15 | 270 | 4 | 2.3 | 0.50 | 0.53 | −0.03 |
| S83 | 0.00 | −3.00 | 0 | 3.00 | 2.15 | 270 | 4 | 2.4 | 0.50 | 0.51 | −0.01 |
| S84 | 0.00 | −3.50 | 0 | 3.00 | 2.15 | 270 | 4 | 2.4 | 0.50 | 0.49 | 0.01 |
| S85 | 0.00 | −4.00 | 0 | 3.00 | 2.15 | 270 | 4 | 2.4 | 0.50 | 0.47 | 0.03 |

Figure 17:
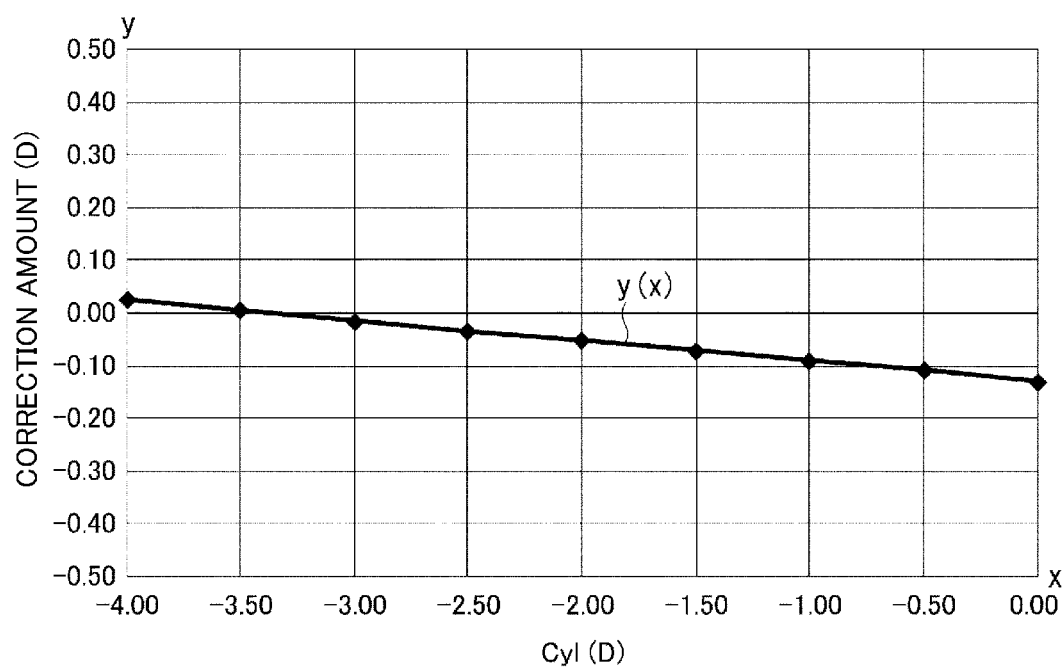
FIG. 17 is a graph depicting the relationship between the cylindrical power Cyl and the correction amount.

When the cylindrical power Cyl is x and the correction amount CDD is y, the relational expression y(x) is $$y = 1.0 \times 10^{-05} x^2 - 0.0385 x - 0.1275,$$

and this relational expression y(x) and the computing result are depicted in FIG. 17.

Table 16 shows the simulation values SDD and the correction amounts CDD in the case when the cylindrical axis direction Ax is 45° and the cylindrical power Cyl is 0.00 diopters (D) (S86), −0.50 diopters (D) (S87), −1.00 diopters (D) (S88), −1.50 diopters (D) (S89), −2.00 diopters (D) (S90), −2.50 diopters (D) (S91), −3.00 diopters (D) (S92), −3.50 diopters (D) (S93), and −4.00 diopters (D) (S94). Further, the parameters required to determine the simulation value SDD are indicated in Table 16.

TABLE 16

|  | Sph | Cyl | Ax | ADD | Pr | PBE | ABC | CT | FAD | SDD | CDD |
|---|---|---|---|---|---|---|---|---|---|---|---|
| S86 | 0.00 | 0.00 | 45 | 3.00 | 2.15 | 270 | 4 | 2.4 | 0.50 | 0.63 | −0.13 |
| S87 | 0.00 | −0.50 | 45 | 3.00 | 2.15 | 270 | 4 | 2.4 | 0.50 | 0.62 | −0.12 |
| S88 | 0.00 | −1.00 | 45 | 3.00 | 2.15 | 270 | 4 | 2.4 | 0.50 | 0.61 | −0.11 |
| S89 | 0.00 | −1.50 | 45 | 3.00 | 2.15 | 270 | 4 | 2.5 | 0.50 | 0.60 | −0.10 |
| S90 | 0.00 | −2.00 | 45 | 3.00 | 2.15 | 270 | 4 | 2.5 | 0.50 | 0.58 | −0.08 |
| S91 | 0.00 | −2.50 | 45 | 3.00 | 2.15 | 270 | 4 | 2.5 | 0.50 | 0.57 | −0.07 |
| S92 | 0.00 | −3.00 | 45 | 3.00 | 2.15 | 270 | 4 | 2.5 | 0.50 | 0.56 | −0.06 |
| S93 | 0.00 | −3.50 | 45 | 3.00 | 2.15 | 270 | 4 | 2.5 | 0.50 | 0.55 | −0.05 |
| S94 | 0.00 | −4.00 | 45 | 3.00 | 2.15 | 270 | 4 | 2.5 | 0.50 | 0.54 | −0.04 |

Figure 18:
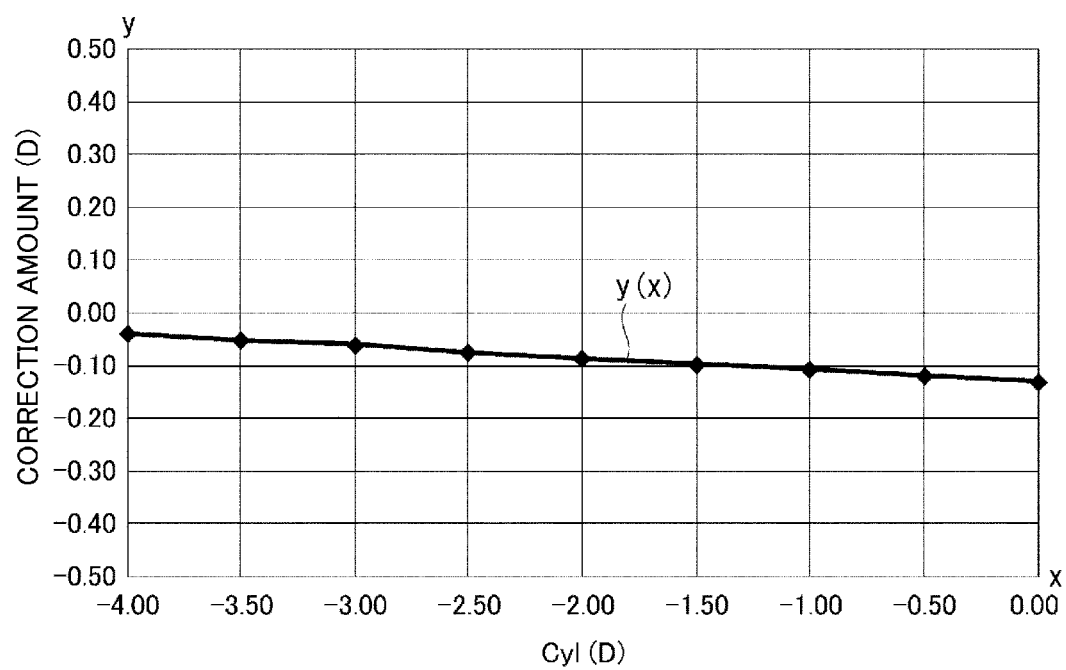
FIG. 18 is a graph depicting the relationship between the cylindrical power Cyl and the correction amount.

When the cylindrical power Cyl is x and the correction amount CDD is y, the relational expression y(x) is $$y = 0.0003 x^2 - 0.0214 x - 0.128,$$

and this relational expression y(x) and the computing result are depicted in FIG. 18.

Table 17 shows the simulation values SDD and the correction amounts CDD in the case when the cylindrical axis direction Ax is 90° and the cylindrical power Cyl is 0.00 diopters (D) (S95), −0.50 diopters (D) (S96), −1.00 diopters (D) (S97), −1.50 diopters (D) (S98), −2.00 diopters (D) (S99), −2.50 diopters (D) (S100), −3.00 diopters (D) (S101), −3.50 diopters (D) (S102), and −4.00 diopters (D) (S103). Further, the parameters required to determine the simulation value SDD are indicated in Table 17.

TABLE 17

|  | Sph | Cyl | Ax | ADD | Pr | PBE | ABC | CT | FAD | SDD | CDD |
|---|---|---|---|---|---|---|---|---|---|---|---|
| S95 | 0.00 | 0.00 | 90 | 3.00 | 2.15 | 270 | 4 | 2.4 | 0.50 | 0.63 | −0.13 |
| S96 | 0.00 | −0.50 | 90 | 3.00 | 2.15 | 270 | 4 | 2.4 | 0.50 | 0.62 | −0.12 |
| S97 | 0.00 | −1.00 | 90 | 3.00 | 2.15 | 270 | 4 | 2.4 | 0.50 | 0.62 | −0.12 |
| S98 | 0.00 | −1.50 | 90 | 3.00 | 2.15 | 270 | 4 | 2.4 | 0.50 | 0.61 | −0.11 |
| S99 | 0.00 | −2.00 | 90 | 3.00 | 2.15 | 270 | 4 | 2.4 | 0.50 | 0.61 | −0.11 |
| S100 | 0.00 | −2.50 | 90 | 3.00 | 2.15 | 270 | 4 | 2.4 | 0.50 | 0.61 | −0.11 |
| S101 | 0.00 | −3.00 | 90 | 3.00 | 2.15 | 270 | 4 | 2.4 | 0.50 | 0.60 | −0.10 |
| S102 | 0.00 | −3.50 | 90 | 3.00 | 2.15 | 270 | 4 | 2.4 | 0.50 | 0.60 | −0.10 |
| S103 | 0.00 | −4.00 | 90 | 3.00 | 2.15 | 270 | 4 | 2.4 | 0.50 | 0.59 | −0.09 |

Figure 19:
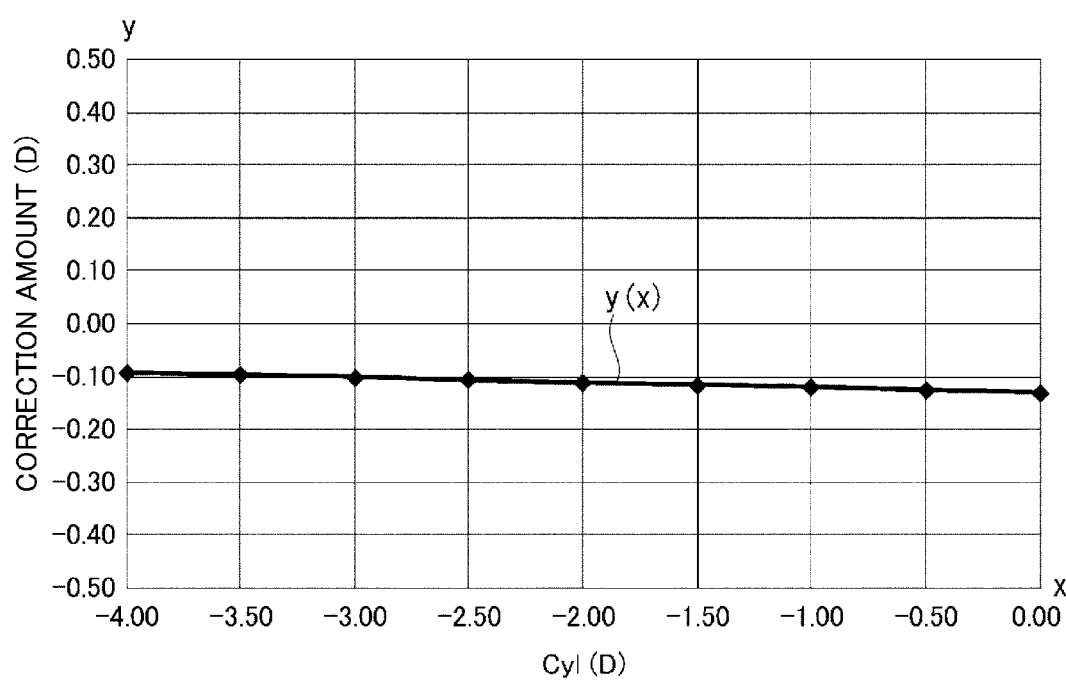
FIG. 19 is a graph depicting the relationship between the cylindrical power Cyl and the correction amount.

When the cylindrical power Cyl is x and the correction amount CDD is y, the relational expression y(x) is $$y=-0.0002x^2-0.0127x-0.1367,$$

and this relational expression y(x) and the computing result are depicted in FIG. 19.

Table 18 shows the simulation values SDD and the correction amounts CDD in the case when the cylindrical axis direction Ax is 135° and the cylindrical power Cyl is 0.00 diopters (D) (S104), −0.50 diopters (D) (S105), −1.00 diopters (D) (S106), −1.50 diopters (D) (S107), −2.00 diopters (D) (S108), −2.50 diopters (D) (S109), −3.00 diopters (D) (S110), −3.50 diopters (D) (S111), and −4.00 diopters (D) (S112). Further, the parameters required to determine the simulation value SDD are indicated in Table 18.

TABLE 18

|  | Sph | Cyl | Ax | ADD | Pr | PBE | ABC | CT | FAD | SDD | CDD |
|---|---|---|---|---|---|---|---|---|---|---|---|
| S104 | 0.00 | 0.00 | 135 | 3.00 | 2.15 | 270 | 4 | 2.4 | 0.50 | 0.63 | −0.13 |
| S105 | 0.00 | −0.50 | 135 | 3.00 | 2.15 | 270 | 4 | 2.4 | 0.50 | 0.62 | −0.12 |
| S106 | 0.00 | −1.00 | 135 | 3.00 | 2.15 | 270 | 4 | 2.4 | 0.50 | 0.60 | −0.10 |
| S107 | 0.00 | −1.50 | 135 | 3.00 | 2.15 | 270 | 4 | 2.5 | 0.50 | 0.60 | −0.10 |
| S108 | 0.00 | −2.00 | 135 | 3.00 | 2.15 | 270 | 4 | 2.5 | 0.50 | 0.58 | −0.08 |
| S109 | 0.00 | −2.50 | 135 | 3.00 | 2.15 | 270 | 4 | 2.5 | 0.50 | 0.57 | −0.07 |
| S110 | 0.00 | −3.00 | 135 | 3.00 | 2.15 | 270 | 4 | 2.5 | 0.50 | 0.56 | −0.06 |
| S111 | 0.00 | −3.50 | 135 | 3.00 | 2.15 | 270 | 4 | 2.6 | 0.50 | 0.55 | −0.05 |
| S112 | 0.00 | −4.00 | 135 | 3.00 | 2.15 | 270 | 4 | 2.6 | 0.50 | 0.54 | −0.04 |

Figure 20:
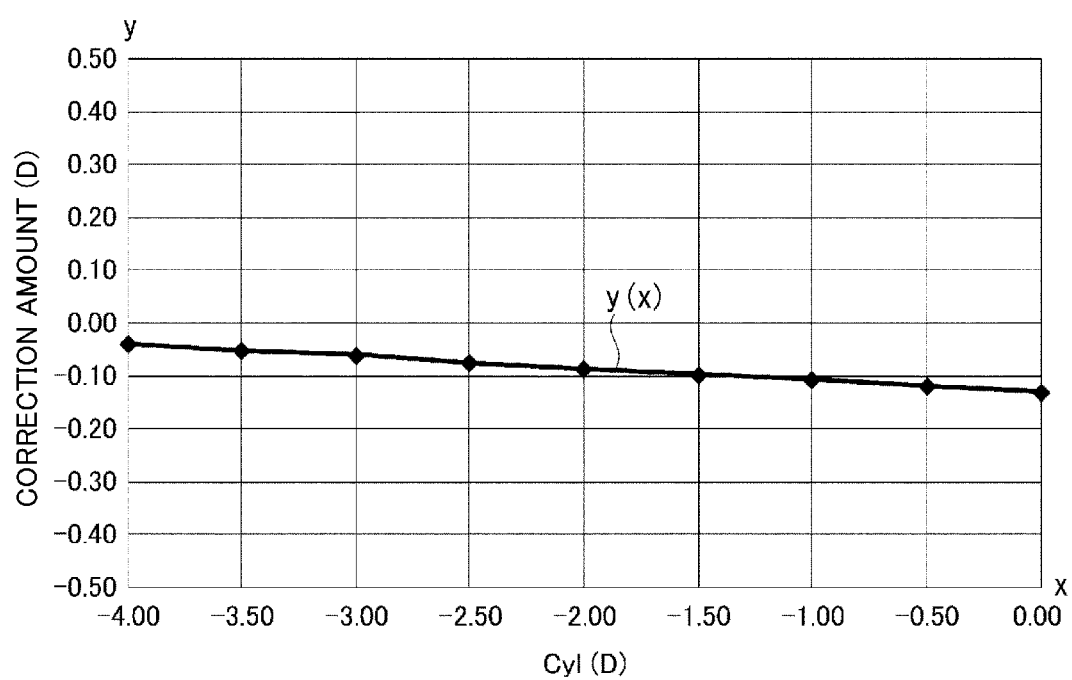
FIG. 20 is a graph depicting the relationship between the cylindrical power Cyl and the correction amount.

When the cylindrical power Cyl is x and the correction amount CDD is y, the relational expression y(x) is $$y=-0.0006x^2-0.0268x-0.1367,$$

and this relational expression y(x) and the computing result are depicted in FIG. 20.

Next the change in the correction amount CDD, when the target addition power FAD is 1.00 diopters (D) and the prism power Pr is changed with respect to a typical prism base direction PBE, will be described based on S113 to S140.

Table 19 shows the simulation values SDD and the correction amounts CDD in the case when the prism base direction PBE is 0° and the prism power Pr is 0.00 diopters (D) (S113), 0.50 diopters (D) (S114), 1.00 diopters (D) (S115), 1.50 diopters (D) (S116), 2.00 diopters (D) (S117), 2.50 diopters (D) (S118), and 3.00 diopters (D) (S119). Further, the parameters required to determine the simulation value SDD are indicated in Table 19.

TABLE 19

|  | Sph | Cyl | Ax | ADD | Pr | PBE | ABC | CT | FAD | SDD | CDD |
|---|---|---|---|---|---|---|---|---|---|---|---|
| S113 | 0.00 | 0.00 | 0 | 3.00 | 0.00 | 0 | 4 | 3.2 | 1.00 | 1.15 | −0.15 |
| S114 | 0.00 | 0.00 | 0 | 3.00 | 0.50 | 0 | 4 | 3.3 | 1.00 | 1.15 | −0.15 |
| S115 | 0.00 | 0.00 | 0 | 3.00 | 1.00 | 0 | 4 | 3.4 | 1.00 | 1.15 | −0.15 |
| S116 | 0.00 | 0.00 | 0 | 3.00 | 1.50 | 0 | 4 | 3.5 | 1.00 | 1.16 | −0.16 |
| S117 | 0.00 | 0.00 | 0 | 3.00 | 2.00 | 0 | 4 | 3.6 | 1.00 | 1.16 | −0.16 |
| S118 | 0.00 | 0.00 | 0 | 3.00 | 2.50 | 0 | 4 | 3.7 | 1.00 | 1.16 | −0.16 |
| S119 | 0.00 | 0.00 | 0 | 3.00 | 3.00 | 0 | 4 | 3.8 | 1.00 | 1.16 | −0.16 |

Figure 21:
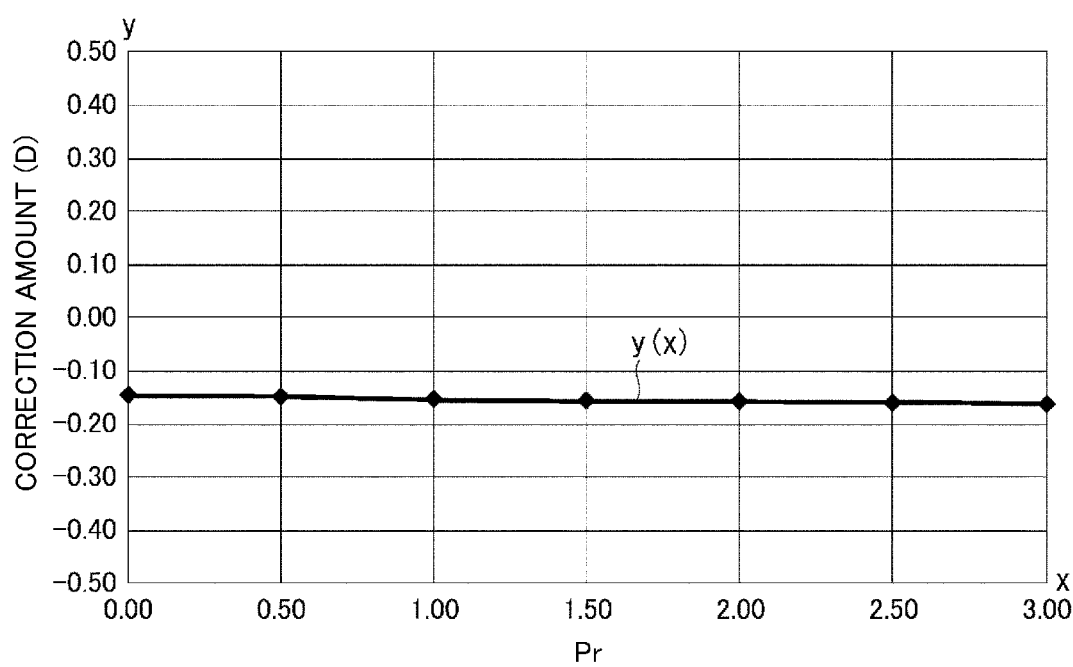
FIG. 21 is a graph depicting the relationship between the prism power Pr and the correction amount.

When the prism power Pr is x and the correction amount CDD is y, the relational expression y(x) is $$y=0.0007x^2-0.0079x-0.147,$$

and this relational expression y(x) and the computing result are depicted in FIG. 21.

Table 20 shows the simulation values SDD and the correction amounts CDD in the case when the prism base direction PBE is 90° and the prism power Pr is 0.00 diopters (D) (S120), 0.50 diopters (D) (S121), 1.00 diopters (D) (S122), 1.50 diopters (D) (S123), 2.00 diopters (D) (S124), 2.50 diopters (D) (S125), and 3.00 diopters (D) (S126). Further, the parameters required to determine the simulation value SDD are indicated in Table 20.

TABLE 20

|  | Sph | Cyl | Ax | ADD | Pr | PBE | ABC | CT | FAD | SDD | CDD |
|---|---|---|---|---|---|---|---|---|---|---|---|
| S120 | 0.00 | 0.00 | 0 | 3.00 | 0.00 | 90 | 4 | 3.2 | 1.00 | 1.15 | −0.15 |
| S121 | 0.00 | 0.00 | 0 | 3.00 | 0.50 | 90 | 4 | 3.4 | 1.00 | 1.15 | −0.15 |
| S122 | 0.00 | 0.00 | 0 | 3.00 | 1.00 | 90 | 4 | 3.7 | 1.00 | 1.15 | −0.15 |
| S123 | 0.00 | 0.00 | 0 | 3.00 | 1.50 | 90 | 4 | 3.9 | 1.00 | 1.15 | −0.15 |
| S124 | 0.00 | 0.00 | 0 | 3.00 | 2.00 | 90 | 4 | 4.2 | 1.00 | 1.15 | −0.15 |
| S125 | 0.00 | 0.00 | 0 | 3.00 | 2.50 | 90 | 4 | 4.4 | 1.00 | 1.15 | −0.15 |
| S126 | 0.00 | 0.00 | 0 | 3.00 | 3.00 | 90 | 4 | 4.7 | 1.00 | 1.15 | −0.15 |

Figure 22:
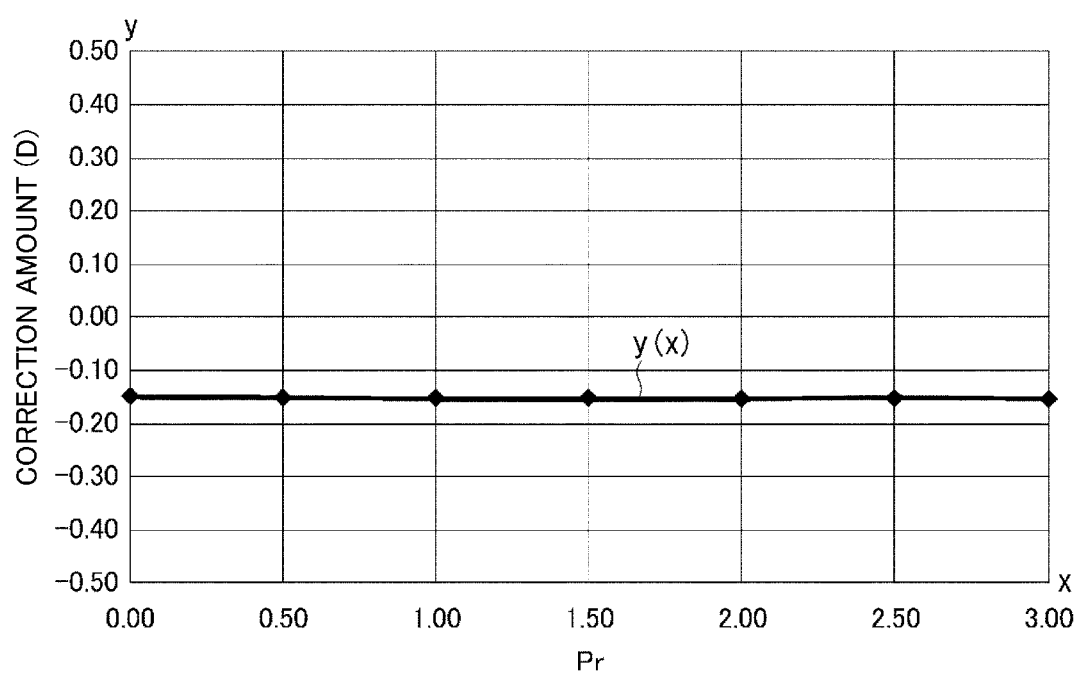
FIG. 22 is a graph depicting the relationship between the prism power Pr and the correction amount.

When the prism power Pr is x and the correction amount CDD is y, the relational expression y(x) is $$y = 0.0009x^2 - 0.0044x - 0.1468,$$

and this relational expression y(x) and the computing result are depicted in FIG. 22.

Table 21 shows the simulation values SDD and the correction amounts CDD in the case when the prism base direction PBE is 180° and the prism power Pr is 0.00 diopters (D) (S127), 0.50 diopters (D) (S128), 1.00 diopters (D) (S129), 1.50 diopters (D) (S130), 2.00 diopters (D) (S131), 2.50 diopters (D) (S132), and 3.00 diopters (D) (S133). Further, the parameters required to determine the simulation value SDD are indicated in Table 23.

TABLE 21

|  | Sph | Cyl | Ax | ADD | Pr | PBE | ABC | CT | FAD | SDD | CDD |
|---|---|---|---|---|---|---|---|---|---|---|---|
| S127 | 0.00 | 0.00 | 0 | 3.00 | 0.00 | 180 | 4 | 3.2 | 1.00 | 1.15 | −0.15 |
| S128 | 0.00 | 0.00 | 0 | 3.00 | 0.50 | 180 | 4 | 3.2 | 1.00 | 1.14 | −0.14 |
| S129 | 0.00 | 0.00 | 0 | 3.00 | 1.00 | 180 | 4 | 3.3 | 1.00 | 1.14 | −0.14 |
| S130 | 0.00 | 0.00 | 0 | 3.00 | 1.50 | 180 | 4 | 3.4 | 1.00 | 1.14 | −0.14 |
| S131 | 0.00 | 0.00 | 0 | 3.00 | 2.00 | 180 | 4 | 3.6 | 1.00 | 1.14 | −0.14 |
| S132 | 0.00 | 0.00 | 0 | 3.00 | 2.50 | 180 | 4 | 3.7 | 1.00 | 1.14 | −0.14 |
| S133 | 0.00 | 0.00 | 0 | 3.00 | 3.00 | 180 | 4 | 3.9 | 1.00 | 1.14 | −0.14 |

Figure 23:
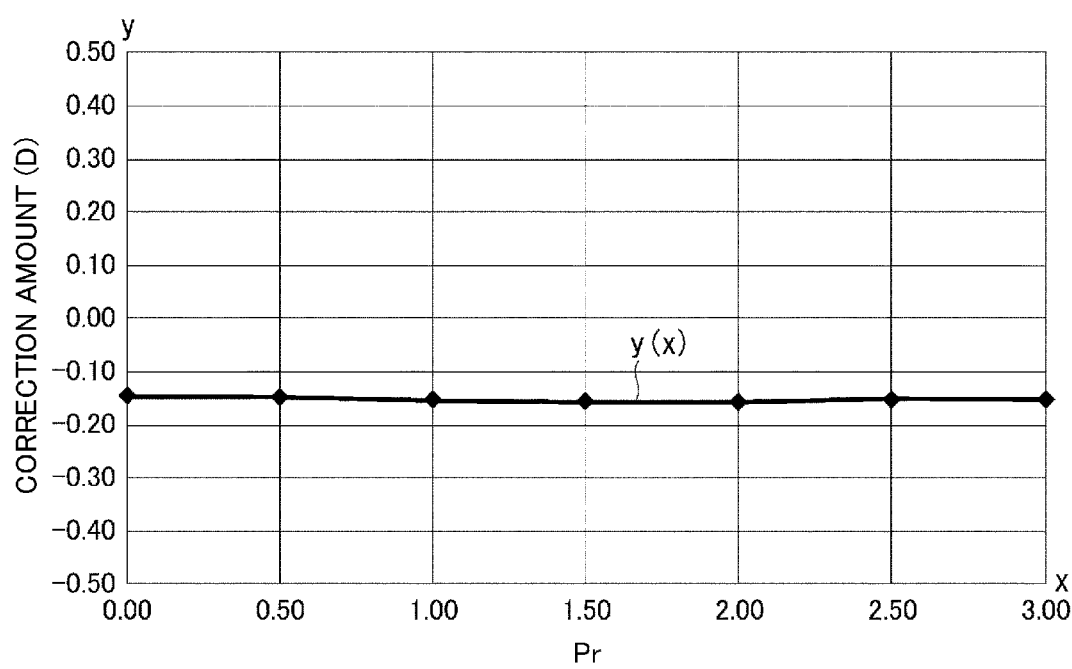
FIG. 23 is a graph depicting the relationship between the prism power Pr and the correction amount.

When the prism power Pr is x and the correction amount CDD is y, the relational expression y(x) is $$y = 0.0009x^2 - 0.0044x - 0.1468,$$

and this relational expression y(x) and the computing result are depicted in FIG. 23.

Table 22 shows the simulation values SDD and the correction amounts CDD in the case when the prism base direction PBE is 270° and the prism power Pr is 0.00 diopters (D) (S134), 0.50 diopters (D) (S135), 1.00 diopters (D) (S136), 1.50 diopters (D) (S137), 2.00 diopters (D) (S138), 2.50 diopters (D) (S139), and 3.00 diopters (D) (S140). Further, the parameters required to determine the simulation value SDD are indicated in Table 22.

TABLE 22

|  | Sph | Cyl | Ax | ADD | Pr | PBE | ABC | CT | FAD | SDD | CDD |
|---|---|---|---|---|---|---|---|---|---|---|---|
| S134 | 0.00 | 0.00 | 0 | 3.00 | 0.00 | 270 | 4 | 3.2 | 1.00 | 1.15 | −0.15 |
| S135 | 0.00 | 0.00 | 0 | 3.00 | 0.50 | 270 | 4 | 3 | 1.00 | 1.15 | −0.15 |
| S136 | 0.00 | 0.00 | 0 | 3.00 | 1.00 | 270 | 4 | 2.7 | 1.00 | 1.14 | −0.14 |
| S137 | 0.00 | 0.00 | 0 | 3.00 | 1.50 | 270 | 4 | 2.5 | 1.00 | 1.14 | −0.14 |
| S138 | 0.00 | 0.00 | 0 | 3.00 | 2.00 | 270 | 4 | 2.4 | 1.00 | 1.14 | −0.14 |
| S139 | 0.00 | 0.00 | 0 | 3.00 | 2.50 | 270 | 4 | 2.4 | 1.00 | 1.14 | −0.14 |
| S140 | 0.00 | 0.00 | 0 | 3.00 | 3.00 | 270 | 4 | 2.5 | 1.00 | 1.14 | −0.14 |

Figure 24:
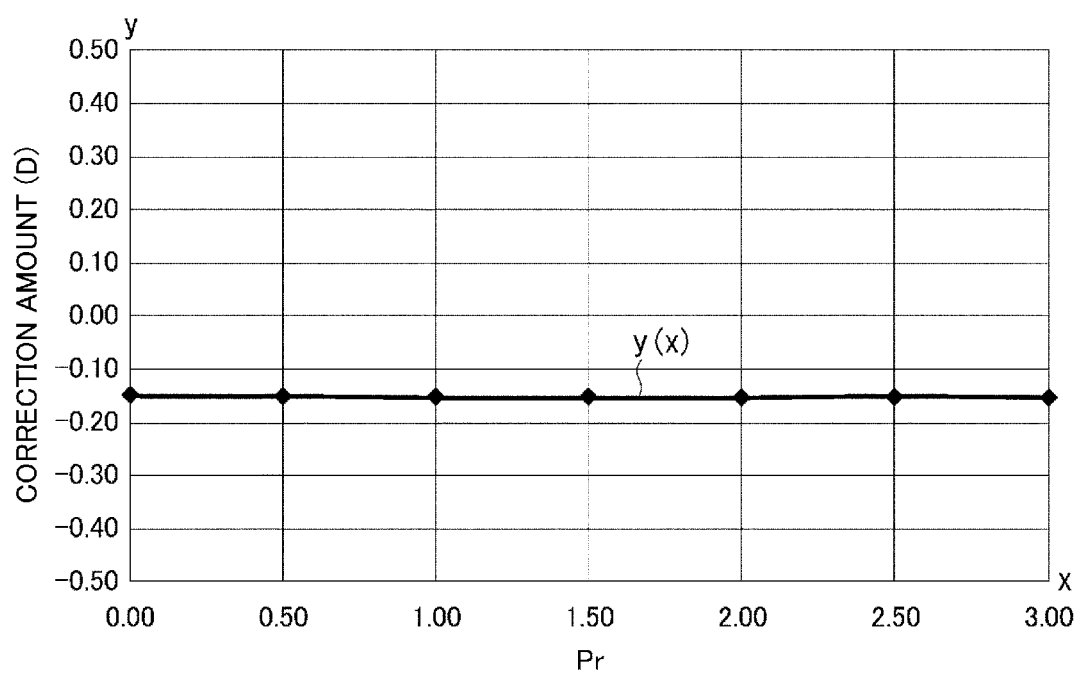
FIG. 24 is a graph depicting the relationship between the prism power Pr and the correction amount.

When the prism power Pr is x and the correction amount CDD is y, the relational expression y(x) is $y=0.0009x^2-0.0044x-0.1468$, and this relational expression y(x) and the computing result are depicted in FIG. 24.

Next the change in the correction amount CDD, when the target addition power FAD is 0.50 diopters (D) and the prism power Pr is changed with respect to the typical prism base direction PBE, will be described based on S141 to S168.

Table 23 shows the simulation values SDD and the correction amounts CDD in the case when the prism base direction PBE is 0° and the prism power Pr is 0.00 diopters (D) (S141), 0.50 diopters (D) (S142), 1.00 diopters (D) (S143), 1.50 diopters (D) (S144), 2.00 diopters (D) (S145), 2.50 diopters (D) (S146), and 3.00 diopters (D) (S147). Further, the parameters required to determine the simulation value SDD are indicated in Table 23.

TABLE 23

|      | Sph  | Cyl  | Ax | ADD  | Pr   | PBE | ABC | CT  | FAD  | SDD  | CDD   |
|------|------|------|----|------|------|-----|-----|-----|------|------|-------|
| S141 | 0.00 | 0.00 | 0  | 3.00 | 0.00 | 0   | 4   | 3.2 | 0.50 | 0.66 | −0.16 |
| S142 | 0.00 | 0.00 | 0  | 3.00 | 0.50 | 0   | 4   | 3.3 | 0.50 | 0.66 | −0.16 |
| S143 | 0.00 | 0.00 | 0  | 3.00 | 1.00 | 0   | 4   | 3.4 | 0.50 | 0.66 | −0.16 |
| S144 | 0.00 | 0.00 | 0  | 3.00 | 1.50 | 0   | 4   | 3.5 | 0.50 | 0.67 | −0.17 |
| S145 | 0.00 | 0.00 | 0  | 3.00 | 2.00 | 0   | 4   | 3.6 | 0.50 | 0.67 | −0.17 |
| S146 | 0.00 | 0.00 | 0  | 3.00 | 2.50 | 0   | 4   | 3.7 | 0.50 | 0.67 | −0.17 |
| S147 | 0.00 | 0.00 | 0  | 3.00 | 3.00 | 0   | 4   | 3.8 | 0.50 | 0.67 | −0.17 |

Figure 25:
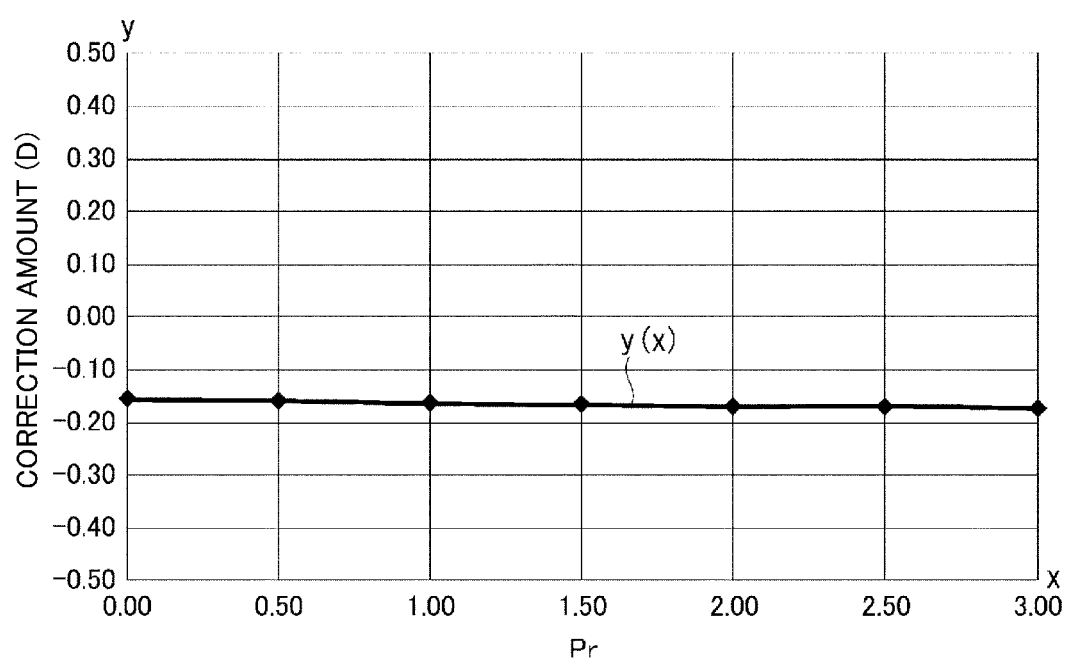
FIG. 25 is a graph depicting the relationship between the prism power Pr and the correction amount.

When the prism power Pr is x and the correction amount CDD is y, the relational expression y(x) is $y=0.0006x^2-0.0075x-0.1568$ and this relational expression y(x) and the computing result are depicted in FIG. 25.

Table 24 shows the simulation values SDD and the correction amounts CDD in the case when the prism base direction PBE is 90° and the prism power Pr is 0.00 diopters (D) (S148), 0.50 diopters (D) (S149), 1.00 diopters (D) (S150), 1.50 diopters (D) (S151), 2.00 diopters (D) (S152), 2.50 diopters (D) (S153), and 3.00 diopters (D) (S154). Further, the parameters required to determine the simulation value SDD are indicated in Table 24.

TABLE 24

|      | Sph  | Cyl  | Ax | ADD  | Pr   | PBE | ABC | CT  | FAD  | SDD  | CDD   |
|------|------|------|----|------|------|-----|-----|-----|------|------|-------|
| S148 | 0.00 | 0.00 | 0  | 3.00 | 0.00 | 90  | 4   | 3.2 | 0.50 | 0.66 | −0.16 |
| S149 | 0.00 | 0.00 | 0  | 3.00 | 0.50 | 90  | 4   | 3.4 | 0.50 | 0.66 | −0.16 |
| S150 | 0.00 | 0.00 | 0  | 3.00 | 1.00 | 90  | 4   | 3.7 | 0.50 | 0.67 | −0.17 |
| S151 | 0.00 | 0.00 | 0  | 3.00 | 1.50 | 90  | 4   | 3.9 | 0.50 | 0.67 | −0.17 |
| S152 | 0.00 | 0.00 | 0  | 3.00 | 2.00 | 90  | 4   | 4.2 | 0.50 | 0.68 | −0.18 |
| S153 | 0.00 | 0.00 | 0  | 3.00 | 2.50 | 90  | 4   | 4.4 | 0.50 | 0.68 | −0.18 |
| S154 | 0.00 | 0.00 | 0  | 3.00 | 3.00 | 90  | 4   | 4.7 | 0.50 | 0.69 | −0.19 |

Figure 26:
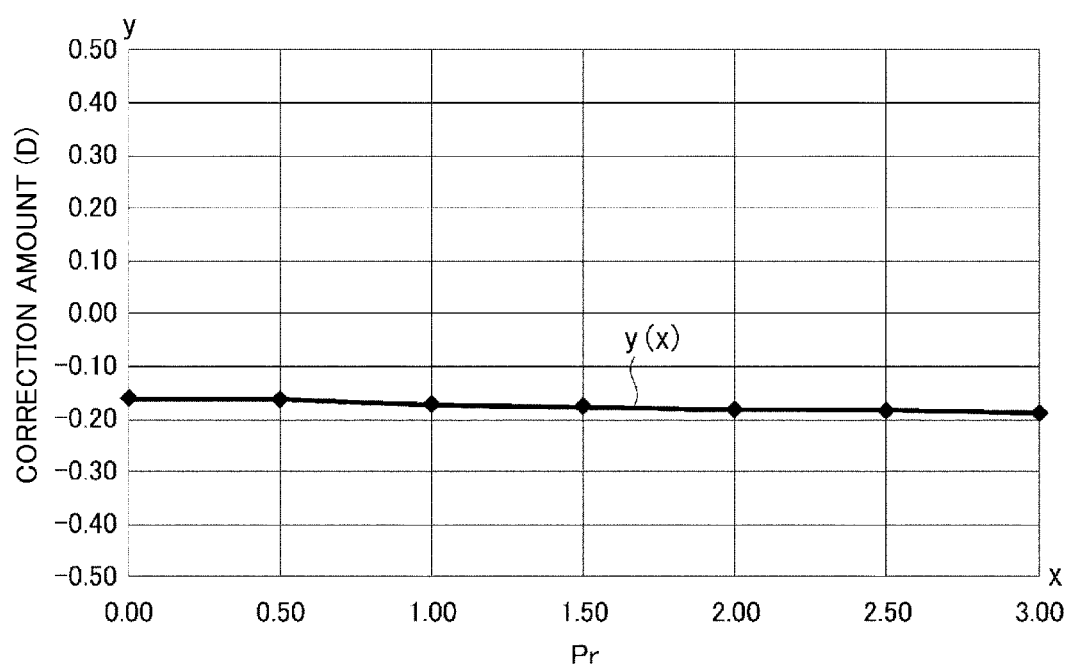
FIG. 26 is a graph depicting the relationship between the prism power Pr and the correction amount.

When the prism power Pr is x and the correction amount CDD is y, the relational expression y(x) is $y=0.0011x^2-0.0132x-0.1566$, and this relational expression y(x) and the computing result are depicted in FIG. 26.

Table 25 shows the simulation values SDD and the correction amounts CDD in the case when the prism base direction PBE is 180° and the prism power Pr is 0.00 diopters (D) (S155), 0.50 diopters (D) (S156), 1.00 diopters (D) (S157), 1.50 diopters (D) (S158), 2.00 diopters (D) (S159), 2.50 diopters (D) (S160), and 3.00 diopters (D) (S161). Further, the parameters required to determine the simulation value SDD are indicated in Table 25.

TABLE 25

|  | Sph | Cyl | Ax | ADD | Pr | PBE | ABC | CT | FAD | SDD | CDD |
|---|---|---|---|---|---|---|---|---|---|---|---|
| S155 | 0.00 | 0.00 | 0 | 3.00 | 0.00 | 180 | 4 | 3.2 | 0.50 | 0.66 | −0.16 |
| S156 | 0.00 | 0.00 | 0 | 3.00 | 0.50 | 180 | 4 | 3.2 | 0.50 | 0.66 | −0.16 |
| S157 | 0.00 | 0.00 | 0 | 3.00 | 1.00 | 180 | 4 | 3.3 | 0.50 | 0.66 | −0.16 |
| S158 | 0.00 | 0.00 | 0 | 3.00 | 1.50 | 180 | 4 | 3.4 | 0.50 | 0.65 | −0.15 |
| S159 | 0.00 | 0.00 | 0 | 3.00 | 2.00 | 180 | 4 | 3.6 | 0.50 | 0.66 | −0.16 |
| S160 | 0.00 | 0.00 | 0 | 3.00 | 2.50 | 180 | 4 | 3.7 | 0.50 | 0.66 | −0.16 |
| S161 | 0.00 | 0.00 | 0 | 3.00 | 3.00 | 180 | 4 | 3.9 | 0.50 | 0.66 | −0.16 |

Figure 27:
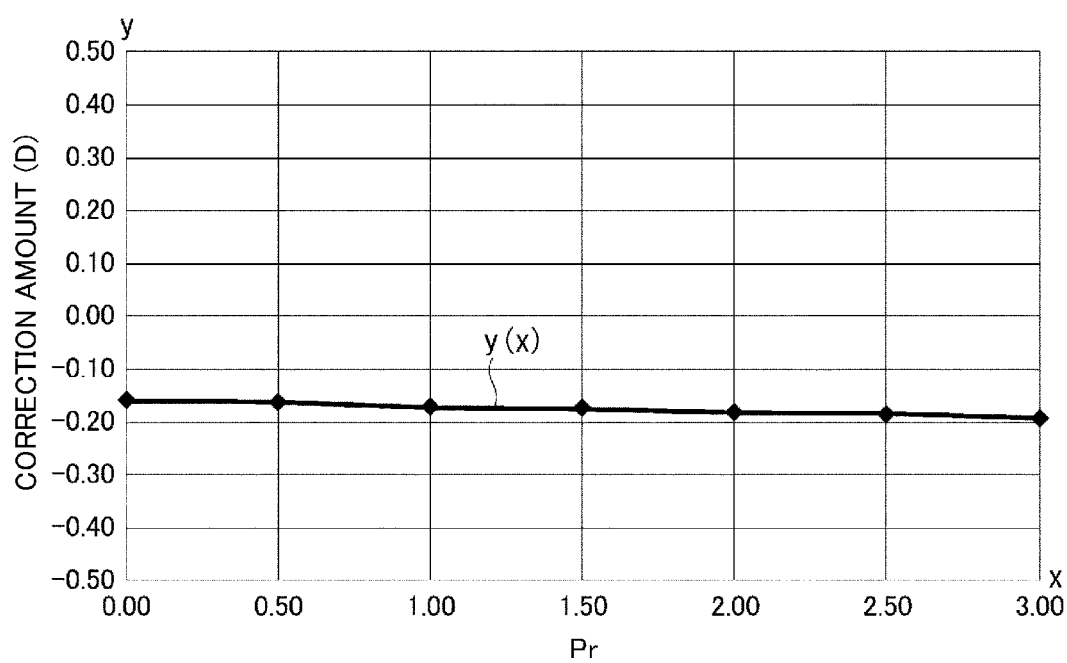
FIG. 27 is a graph depicting the relationship between the prism power Pr and the correction amount.

When the prism power Pr is x and the correction amount CDD is y, the relational expression y(x) is $$y=0.0011x^2-0.0132x-0.1566,$$

and this relational expression y(x) and the computing result are depicted in FIG. 27.

Table 26 shows the simulation values SDD and the correction amounts CDD in the case when the prism base direction PBE is 270° and the prism power Pr is 0.00 diopters (D) (S162), 0.50 diopters (D) (S163), 1.00 diopters (D) (S164), 1.50 diopters (D) (S165), 2.00 diopters (D) (S166), 2.50 diopters (D) (S167), and 3.00 diopters (D) (S168). Further, the parameters required to determine the simulation value SDD are indicated in Table 26.

TABLE 26

|  | Sph | Cyl | Ax | ADD | Pr | PBE | ABC | CT | FAD | SDD | CDD |
|---|---|---|---|---|---|---|---|---|---|---|---|
| S162 | 0.00 | 0.00 | 0 | 3.00 | 0.00 | 270 | 4 | 3.2 | 0.50 | 0.66 | −0.16 |
| S163 | 0.00 | 0.00 | 0 | 3.00 | 0.50 | 270 | 4 | 3 | 0.50 | 0.65 | −0.15 |
| S164 | 0.00 | 0.00 | 0 | 3.00 | 1.00 | 270 | 4 | 2.7 | 0.50 | 0.64 | −0.14 |
| S165 | 0.00 | 0.00 | 0 | 3.00 | 1.50 | 270 | 4 | 2.5 | 0.50 | 0.63 | −0.13 |
| S166 | 0.00 | 0.00 | 0 | 3.00 | 2.00 | 270 | 4 | 2.4 | 0.50 | 0.63 | −0.13 |
| S167 | 0.00 | 0.00 | 0 | 3.00 | 2.50 | 270 | 4 | 2.4 | 0.50 | 0.63 | −0.13 |
| S168 | 0.00 | 0.00 | 0 | 3.00 | 3.00 | 270 | 4 | 2.5 | 0.50 | 0.63 | −0.13 |

Figure 28:
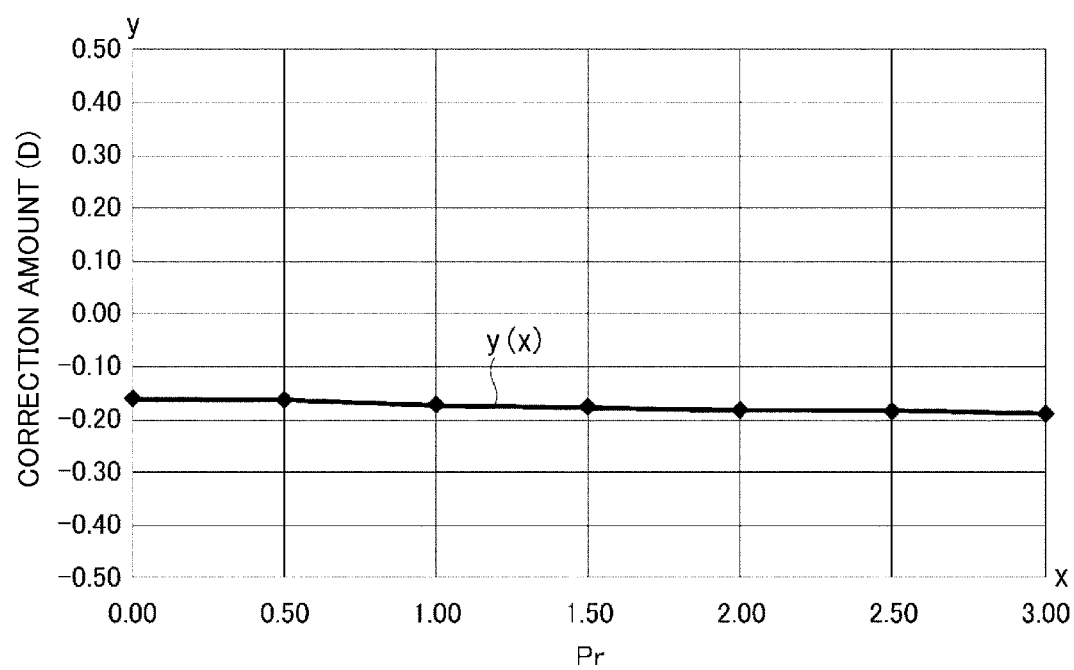
FIG. 28 is a graph depicting the relationship between the prism power Pr and the correction amount.

When the prism power Pr is x and the correction amount CDD is y, the relational expression y(x) is $$y=0.0011x^2-0.0132x-0.1566,$$

and this relational expression y(x) and the computing result are depicted in FIG. 28.

The design method for a progressive power lens according to the embodiment will be described next with reference to FIG. 29A to FIG. 31B.

[First Model]

The first model is designed. In the first model, the surface power of the eyeball side surface (concave surface) of the lens is controlled. Furthermore, the object side surface (convex surface) of the lens is a spherical surface.

For example, the first model is designed as a progressive power lens: the spherical power Sph is −8.00 diopters (D), the first power D1 is 9.00 diopters (D), the second power D2 is 6.00 diopters (D), and the prescription addition power ADD is 3.00 diopters (D). The fitting point FP is set at a position corresponding to the principal meridian (the origin O of the Y axis in FIG. 1A), and the target addition power FAD is set to 0.5 diopters (D). The surface power distribution at a progressive surface (concave surface) side of the first model is illustrated in FIG. 29A.

Figure 29A:
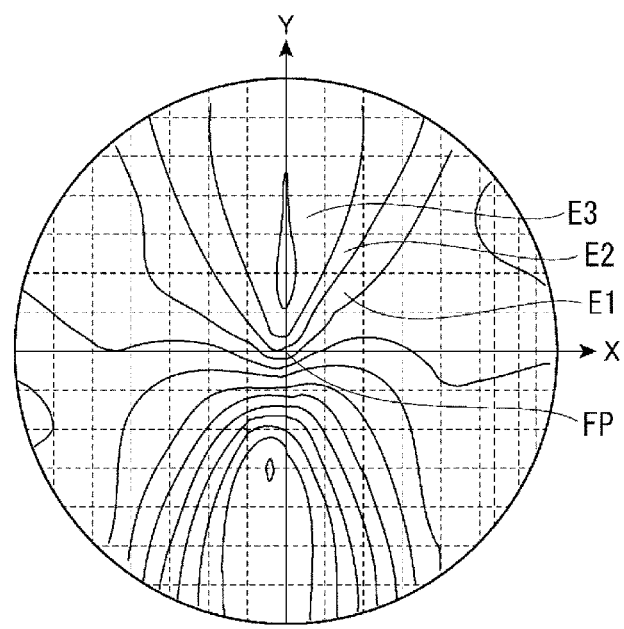
FIG. 29A is a surface refractive power distribution diagram of a first model.

In FIG. 29A, the power of a region E1 is 8.00 to 8.25 diopters (D), the power of a region E2 is 8.25 to 8.50 diopters (D), and the power of a region E3 is 8.50 to 8.75 diopters (D). The fitting point FP is at the boundary between the region E2 and the region E3, hence the power at a position corresponding to the fitting point FP on the principal meridian is 8.50 diopters (D), which is a value determined by subtracting the target addition power FAD from the first power D1.

Figure 29B:
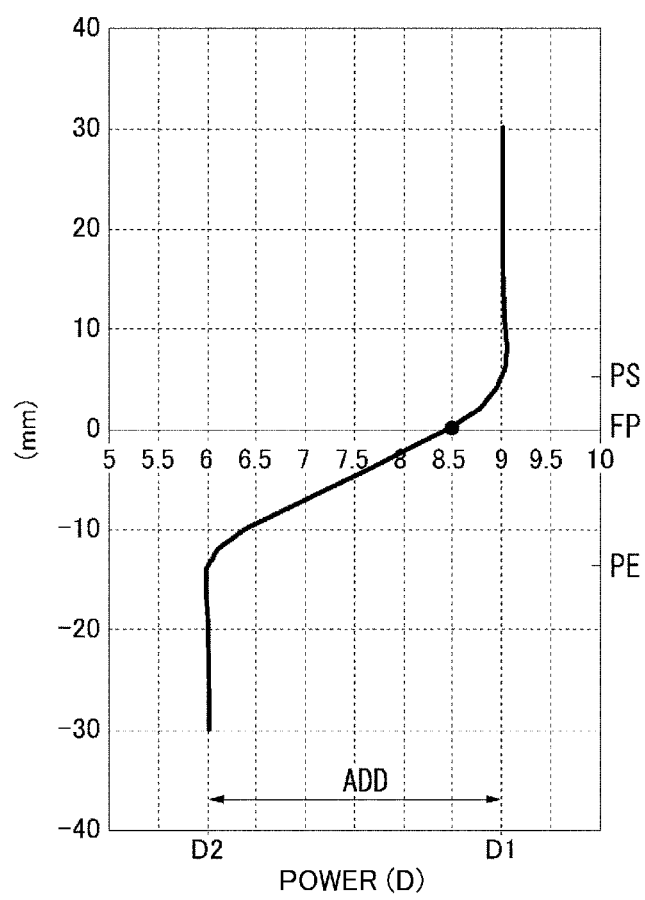
FIG. 29B is a graph depicting the relationship between the surface power (refractive power) of the first model and the position on the principal meridian.

FIG. 29B depicts the relationship between the power of the eyeball side surface of the lens and the position on the principal meridian. In FIG. 29B, the power changes from the progression-start point PS to the progression-end point PE, and the power at a position corresponding to the fitting point FP on the principal meridian is 8.5 diopters (D).

[Simulation Step]

In the simulation device 20, the vision simulation on the assumption that spectacles are worn is performed for the first model which is designed by setting the target addition power FAD at the fitting point FP.

In the simulation device 20, the vision simulation is performed a plurality of times with changing the parameters as indicated in Table 1 to Table 28, and results are output to the computer 30.

Figure 30A:
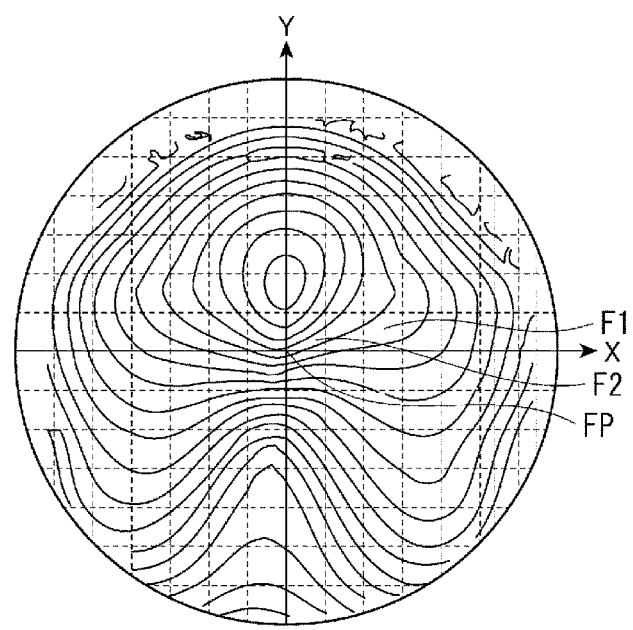
FIG. 30A is a surface refractive power distribution diagram of the first model after the vision simulation.
Figure 30B:
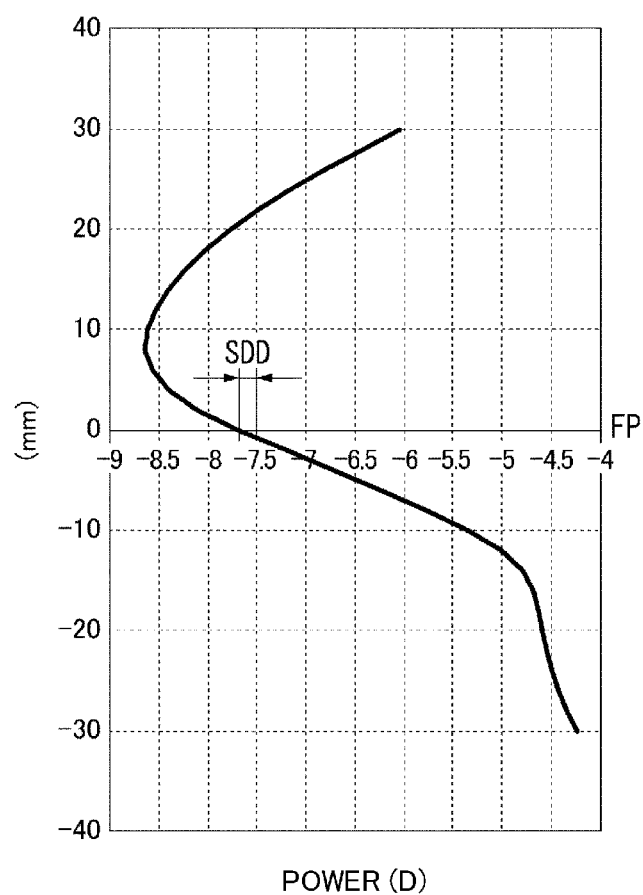
FIG. 30B is a graph depicting the relationship between the surface power (refractive power) of the first model and the position on the principal meridian after the vision simulation.

For example, FIG. 30A and FIG. 30B depict the results when the vision simulation was performed for the first model depicted in FIG. 29A and FIG. 29B. FIG. 30A and FIG. 30B depict visual states, unlike FIG. 29A and FIG. 29B.

In FIG. 30A, the power of the region F1 is −7.50 to −7.25 diopters (D), and the power of the region F2 is −7.50 to −7.75 diopters (D). The fitting point FP is in the region F2.

FIG. 30B depicts a relationship between the power and the position on the principal meridian. In FIG. 30B, the simulation value for the power is −7.70 diopters (D) at a position corresponding to the fitting point FP on the principal meridian. This is equivalent to 0.20 diopters (D) of the simulation value SDD for the addition power at the position corresponding to the fitting point FP on the principal meridian.

[Correction Amount Computing Step]

A simulation result from the simulation device 20 is acquired by the information acquiring unit 41 of the computer 30.

In the computing unit 42, the correction amount CDD is computed based on the simulation result acquired by the information acquiring unit 41 and the information of the progressive power lens to be designed, which is input via the input unit 50, and the relational expression is determined based on the correction amount CDD.

[Storing Step]

Based on a result computed by the computing unit 42, the relationship between the parameters and the correction amount and the relationship between the parameters and the relational expression are stored in the storage unit 43.

[Design Step]

When the parameters of the progressive power lens to be designed are input via the input unit 50, the correction amount for designing a second model is determined in the control unit 44, based on the information input via the input unit 50 and the information stored in the storage unit 43.

For example, in the case of designing the progressive power lens depicted in FIG. 29A and FIG. 29B, the first power is −8.00 diopters (D) and the target addition power FAD is 0.50 diopters (D), hence the power is −7.50 diopters (D) in the design. However, as depicted in FIG. 30A and FIG. 30B, the simulation value for the power after the vision simulation is −7.70 diopters (D). This is because the simulation value SDD for the addition power converted is 0.30 diopters (D), which is 0.2 diopters (D) short of the target addition power value FAD. Therefore, the correction amount CDD is 0.20 diopters (D), which is this short amount.

Furthermore, the target addition power FAD of the progressive power lens to be designed is set to 0.50 diopters (D), which is a value set for the vision simulation, but if the target addition power FAD of the progressive power lens to be designed is a value which was not set for the vision simulation, the correction amount CDD is calculated based on the relational expression.

The second model is designed by adding the correction amount CDD, which is determined by the control unit 44, to the target addition power FAD, and setting again a corrected addition power at the position corresponding to the fitting point FP on the principal meridian.

Figure 31A:
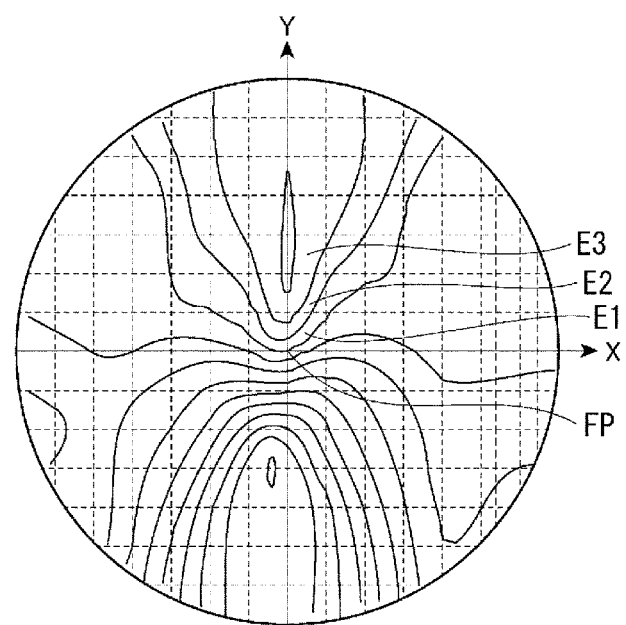
FIG. 31A is a surface power distribution diagram of the first model in which the correction amount is added.
Figure 31B:
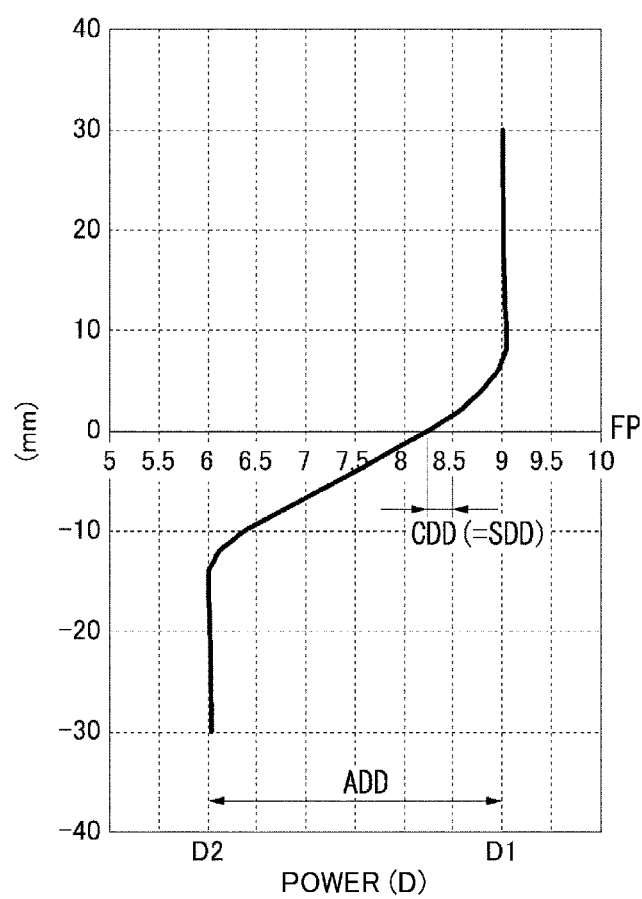
FIG. 31B is a graph depicting the relationship between the surface power (refractive power) of the first model and the position on the principal meridian after the correction amount is added.

For example, as depicted in FIG. 31A and FIG. 31B, when the first model was designed, a value (8.70 diopters (D)), which is obtained by adding 0.2 diopters (D) of the correction amount CDD to 8.50 diopters (D) of power which is set as the addition power corresponding to the fitting point FP on the principal meridian, is set again.

Therefore according to Embodiment 1, the following effects can be obtained.

The vision simulation on the assumption that spectacles are worn is performed for a first model, which is designed by setting a desired value of the target addition power FAD at a position corresponding to the fitting point FP on the principal meridian, and a correction amount CDD, for correcting the difference between the target addition power FAD and a simulation value SDD for the addition power at the position corresponding to the fitting point FP on the principal meridian, acquired by the vision simulation, is computed. A second model is designed by setting again the addition power determined by adding the computed correction amount CDD to the target addition power FAD, and then the vision simulation on the assumption that spectacles are actually worn is performed for the first model. Therefore, the possibility of deviation of the target addition power FAD at the fitting point FP from the addition power when the lens is worn is low in the final second model.

The reason that causes deviation of the addition power when the progressive power lens from the target addition power FAD is actually worn is related to the amount of the target addition power FAD, the prescription addition power ADD, the spherical power Sph, the cylindrical power Cyl, the cylindrical axis direction Ax, the prism power Pr, and the prism base direction PBE, hence the correction amount is determined for each of the data related to these factors, and as a result, deviation of the target addition power FAD at the fitting point from the addition power when the lens is actually worn can be minimized.

Further, the relational expression y(x) is determined to indicate the relationship between the correction amount CDD, which is determined for each of the simulations performed a plurality of times, and the parameters, and the addition power is set based on this relational expression, therefore even if a value of a parameter is not used in the simulation step, a correction amount corresponding to this value can be determined based on the relational expression.

[Embodiment 2]

Embodiment 2 of the present invention will be described next with reference to FIG. 32A and FIG. 32B. In the description of Embodiment 2, the same element as Embodiment 1 is denoted with a same reference sign, for which description is omitted.

In Embodiment 2, the simulation step, the correction amount computing step and the design step are performed in the same manner as Embodiment 1, and then a determination step is performed. The simulation step to the design step may be performed using the computer 30 of Embodiment 1, or by using other devices.

[Determination Step]

A simulation on the assumption that spectacles are worn is performed again for the second model designed in the design step.

The simulation that is performed again is performed in the same step as the simulation step of Embodiment 1.

Figure 32A:
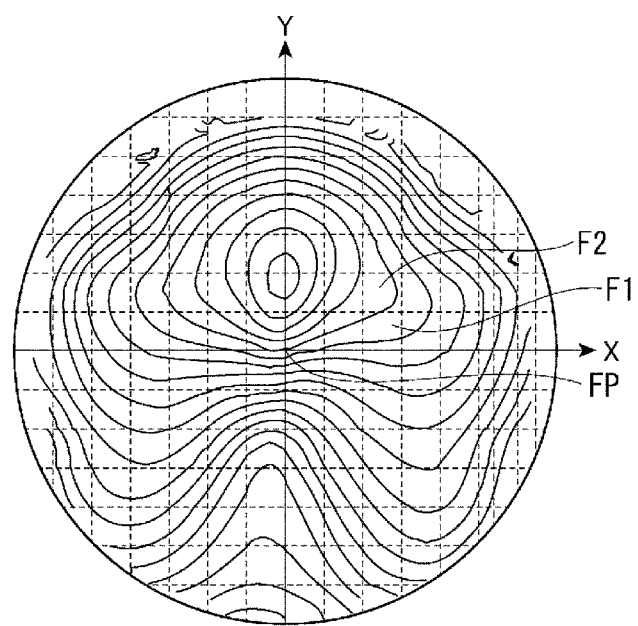
FIG. 32A concerns a key portion of Embodiment 2 of the invention, and is a surface power distribution diagram after the determination step.
Figure 32B:
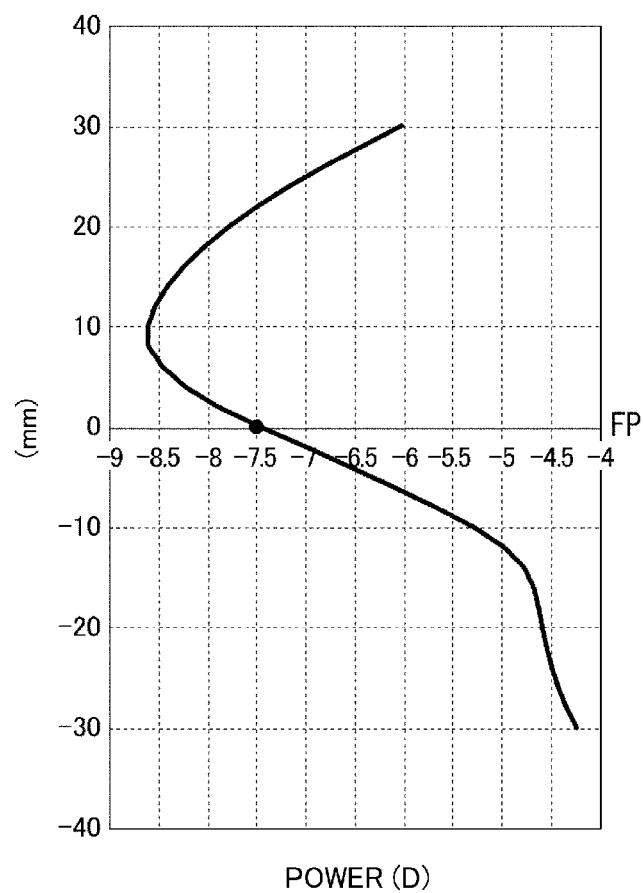
FIG. 32B concerns the key portion of Embodiment 2 of the invention, and is a graph depicting the relationship of the surface power (refractive power) of the first model and the position on the principal meridian after the determination step.

A result obtained in the simulation step performed again is depicted in FIG. 32A and FIG. 32B, for example.

In FIG. 32A, the fitting point FP is on the boundary between the region F1 and the region F2 (−7.50 diopters (D)).

In FIG. 32B, the simulation value for the power is −7.50 diopters (D) at the position on the principal meridian where the fitting point FP is set (origin O).

Therefore the re-performed simulation value (−7.50 diopters (D)) acquired in the simulation step performed again coincides with the power which is set as the target addition power FAD (−7.50 diopters (D)). Thereby the design step ends.

If it is determined in the determination step that the re-simulation value and the desired value based on the target addition power FAD do not coincide, the design step is performed again, and the determination step is performed again.

Therefore, in Embodiment 2, the simulation step on the assumption that spectacles are worn is performed again for the second model designed in the design step, and it is determined whether the re-performed simulation value acquired in the simulation step and the desired value based on the target addition power FAD coincide, hence it can be confirmed whether the correction of the designed progressive power lens is performed accurately.

Furthermore, the present invention is not limited to the above mentioned embodiments, but includes modifications and improvements within a scope of achieving the object of the invention.

For example, in various embodiments, considering that the lines of sight shift inward toward the nose by convergence in the case of near vision, the principal meridian C is constituted by: the linear portion C1 which corresponds to the first region 1A and is set on the vertical Y axis; the linear portion C2, which corresponds to the second region 1B, and is set to be parallel with the Y axis and distant from the Y axis in the X axis direction by dimension I; and the linear portion C3, which corresponds to the intermediate region 1C, and connects the progression-start point PS and the progression-end point PE, but in the present invention, the principal meridian C may be linearly formed along the Y axis across the first region 1A, the intermediate region 1C and the second region 1B. Further, a vertical line segment along the principal meridian are not limited to being set on the Y axis, but may be distant from the Y axis in the X axis direction and parallel with the Y axis.

Further, in the progressive power lens 1 designed in each embodiment, the eyeball side is the progressive surface, and the object side is the spherical surface, but the present invention can also be applied to the structure in which both surfaces on the eyeball side and the object side are designed to progressive surfaces.

Furthermore, in the present invention, the relational expression, for indicating the relationship between the correction amount, which is determined for each of the simulations performed a plurality of times, and the parameters, may be determined in the computing step, as indicated in the examples in FIG. 3 to FIG. 28, and in the design step, the addition power at the position corresponding to the fitting point FP on the principal meridian may be set based on the relational expression determined in the computing step. In the present invention, it is not necessary for the relational expression to be determined.

The invention claimed is:

1. A design method for a progressive power lens in which: an intermediate region where an addition power continuously changes is provided between a first region for providing a first power and a second region for providing a second power; a principal meridian is provided in the first region, the intermediate region and the second region; a progression-start point through which the principal meridian passes is set in a portion of the intermediate region adjacent to the first region; a progression-end point through which the principal meridian passes is set in a portion of the intermediate region adjacent to the second region; and a fitting point is set at a position between the progression-start point and the progression-end point, along an extended line of a portion of the principal meridian that passes through the first region, the design method comprising:
    a simulation step of performing a vision simulation, on the assumption that spectacles are worn, for a first model designed by setting a desired value of a target addition power at a position corresponding to the fitting point on the principal meridian;
    a computing step of computing a correction amount for correcting the difference between the target addition power and a simulation addition value at the position corresponding to the fitting point on the principal meridian obtained in the simulation step; and
    a design step of designing a second model by setting a corrected addition power, which is obtained by adding the correction amount computed in the computing step to the target addition power, at the position corresponding to the fitting point on the principal meridian, wherein
    the target addition power is set in accordance with a target distance to a target position which a user desires to clearly see.

2. The design method for a progressive power lens according to claim 1, wherein
    in the simulation step, numeric values of at least one parameter out of the target addition power of the first model, a prescription addition power which is determined by the difference between the first power and the second power, a cylindrical power, a cylindrical axis direction, a prism power, a prism base direction, and a spherical power in a region for providing the first power are changed, and the simulation step is performed a plurality of times,
    in the computing step, the correction amount is computed for each of the simulations, and
    in the design step, a design addition power at the position corresponding to the fitting point on the principal meridian for designing the second model is set, based on a relationship between the correction amount and at least one of the target addition power, the prescription addition power, the spherical power, the cylindrical power, the cylindrical axis direction, the prism power, and the prism base direction, which are stored in advance.

3. The design method for a progressive power lens according to claim 1, further comprising, a determination step of re-performing the simulation on the assumption that spectacles are worn, and determining whether a re-performed simulation addition value and the desired value coincide, based on the difference between the re-performed simulation addition value and the desired value, after the design step, wherein
    the design step is re-performed when the re-performed simulation addition value and the desired value are determined not to coincide in the determination step.

4. The design method for a progressive power lens according to claim 1, wherein
    the fitting point is set at the position between the progression-start point and the progression-end point, along the extended line of a portion of the principal meridian that passes through the first region, and
    an average gradient of an addition power between the progression-start point and the fitting point is set to differ from an average gradient of an addition power between the fitting point and the progression-end point.

5. A design device for a progressive power lens in which: an intermediate region where an addition power continuously changes is provided between a first region for providing a first power and a second region for providing a second power; a principal meridian is provided in the first region, the intermediate region, and the second region; a progression-start point through which the principal meridian passes is set in a portion of the intermediate region adjacent to the first region; a progression-end point through which the principal meridian passes is set in a portion of the intermediate region adjacent to the second region; and a fitting point is set at a position between the progression-start point and the progression-end point, along an extended line of a portion of the principal meridian that passes through the first region, the design device comprising:
    a simulation device that performs a vision simulation, on the assumption that spectacles are worn, for a first model designed by setting a desired value of a target addition power at a position corresponding to the fitting point on the principal meridian, a plurality of times with changing at least one parameter of the target addition power of the first model, a prescription addition power which is determined by the difference between the first power and the second power, a cylindrical power, a cylindrical axis direction, a prism power, a prism base direction, and a spherical power in a region for providing the first power; and
    a computer that designs the progressive power lens based on a result obtained by the simulation device, wherein the computer comprises:

a computing unit that computes, for each simulation, a correction amount for correcting the difference between the target addition power and a simulation addition value at the fitting point, based on information from the simulation device;

a storage unit that stores a relationship between the correction amount and at least one of the target addition power, the prescription addition power, the spherical power, the cylindrical power, the cylindrical axis direction, the prism power, and the prism base direction, based on a result computed by the computing unit;

an input unit that inputs information of at least one of the target addition power, the prescription addition power, the spherical power, the cylindrical power, the cylindrical axis direction, the prism power, and the prism base direction;

a control unit that determines the correction amount for designing a second model according to the information input from the input unit and the information stored in the storage unit; and a design unit that designs the second model by adding the correction amount determined by the control unit to the target addition power and setting a corrected addition power at the position corresponding to the fitting point on the principal meridian, wherein the target addition power is set in accordance with a target distance to a target position which a user desires to clearly see.

* * * * *